US012025068B1

(12) United States Patent
Dudar et al.

(10) Patent No.: US 12,025,068 B1
(45) Date of Patent: Jul. 2, 2024

(54) SYSTEMS AND METHODS FOR REDUCING EVAPORATIVE EMISSIONS VIA PRE-CHAMBER IGNITION

(71) Applicant: Ford Global Technologies, LLC, Dearborn, MI (US)

(72) Inventors: Aed Dudar, Canton, MI (US); Thomas Leone, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 4 days.

(21) Appl. No.: 18/169,060

(22) Filed: Feb. 14, 2023

(51) Int. Cl.
*F02D 41/00* (2006.01)
*F02B 19/10* (2006.01)

(52) U.S. Cl.
CPC ........ *F02D 41/004* (2013.01); *F02B 19/1085* (2013.01)

(58) Field of Classification Search
CPC ........ F02M 26/49; F02M 26/34; F02M 26/05; Y02T 10/40; F02D 41/0065; F02D 41/22
See application file for complete search history.

(56) References Cited

U.S. PATENT DOCUMENTS 3,999,935 A * 12/1976 Stabinsky ............... F23D 14/20 431/158
5,307,773 A 5/1994 Suzuki
6,152,116 A 11/2000 Duty
7,353,797 B1 4/2008 Breidenthal
9,574,487 B2 2/2017 Gruber et al.
10,364,738 B2 7/2019 VanDerWege
10,557,403 B2 2/2020 Sager et al.
10,767,599 B2 9/2020 Dudar et al.
11,111,885 B2 9/2021 Dudar
11,156,149 B1 10/2021 Leone et al.
11,280,278 B2 3/2022 Leone et al.
11,293,337 B1 4/2022 Czekala et al.
11,365,685 B2 6/2022 Leone et al.
11,378,002 B1 7/2022 Leone et al.
11,512,624 B1 11/2022 Leone et al.
2021/0207524 A1 7/2021 Riley

OTHER PUBLICATIONS

Leone, T. et al., "Methods and Systems for Pre-Chamber," U.S. Appl. No. 17/809,530, filed Jun. 28, 2020, 40 pages.

* cited by examiner

*Primary Examiner* — Xiao En Mo
(74) *Attorney, Agent, or Firm* — Vincent Mastrogiacomo; McCoy Russell LLP

(57) ABSTRACT

Methods and systems are provided for adjusting canister purge flow based on robustness conditions of pre-chamber ignition of an engine at non-steady state operating conditions wherein robustness conditions comprise operating conditions wherein the engine operates at air to fuel ratios that are under or exceed stoichiometric ratios and canister purge flow is adjusted proportionally based on a degree of robustness of the robustness conditions. Further methods are provided for adjusting canister purge flow based on robustness conditions of pre-chamber ignition of the engine at steady state operating conditions.

20 Claims, 8 Drawing Sheets

SYSTEMS AND METHODS FOR REDUCING EVAPORATIVE EMISSIONS VIA PRE-CHAMBER IGNITION

FIELD

The present description relates generally to methods and systems for reducing evaporative emissions via pre-chamber ignition by regulating a flow of canister purge gasses from a fuel vapor storage canister to an engine of a vehicle based on robustness conditions of pre-chamber ignition.

BACKGROUND/SUMMARY

An internal combustion engine combusts an air-fuel mixture within cylinders to produce torque, which may be used to propel a vehicle. In some such engines, an ignition source is used to ignite the air-fuel mixture within each cylinder during a compression stroke. For example, in traditional spark-ignition engines, each cylinder includes a spark plug for directly igniting the air-fuel mixture within the cylinder. In other examples, the air-fuel mixture within the cylinder may be ignited by jets of hot gas and flame from a pre-combustion chamber, referred to herein as a pre-chamber.

A passive pre-chamber may be a walled chamber located in the clearance volume of the cylinder and may include a spark plug. During engine operation, an air-fuel mixture is introduced into the cylinder, and a fraction of the air-fuel mixture is inducted into the passive pre-chamber via a pressure differential between the passive pre-chamber and the cylinder during a compression stroke of the cylinder. When ignition is requested, the spark plug in the pre-chamber actuates, igniting the fraction of the air-fuel mixture in the pre-chamber. After the fraction of the air-fuel mixture is ignited in the pre-chamber, jets of flame and hot gas may exit the pre-chamber and enter the cylinder via one or more holes in the pre-chamber walls. These jets ignite the air-fuel mixture in the cylinder to produce torque.

Vehicle evaporative emissions control systems may be configured to store fuel vapors from fuel tank refueling and diurnal engine operations in a purge canister containing a suitable adsorbent, and then canister purge the stored vapors during a subsequent engine operation. The stored vapors may be routed to an engine intake for combustion, further improving fuel economy.

In a typical canister purge operation, a canister purge valve coupled between the engine intake and the fuel canister is opened, allowing for intake manifold vacuum to be applied to the fuel canister. On a boosted engine, that vacuum draw may be supplied via an ejector during boosted operation. For particular hybrid vehicles, that vacuum draw may be provided via a canister purge pump positioned between the canister and the canister purge valve, for example. Simultaneously, a canister vent valve coupled between the fuel canister and atmosphere is opened, allowing for fresh air to enter the canister. Further, in some examples a vapor blocking valve coupled between the fuel tank and the fuel canister is closed to prevent the flow of fuel vapors from the fuel tank to the engine. This configuration facilitates desorption of stored fuel vapors from the adsorbent material in the canister, regenerating the adsorbent material for further fuel vapor adsorption.

However, due to short run times of the engine, bleed emissions that do not satisfy environmental standards may occur due to infrequent canister purging. Additionally, during a combustion mode of the engine, canister purging is gradual and a canister purge valve may be duty cycled according to a staircase function to prevent vapor slugs from stalling the engine. In this way, bleed emissions may occur as a result of the time duration to complete canister purging.

In one example, the issues described above may be addressed by a method, comprising adjusting canister purge flow based on robustness conditions of pre-chamber ignition of an engine at non-steady and steady state operating conditions. In this way, a canister purging valve may be operated to increase canister purge flow at robust conditions of pre-chamber ignition wherein an air to fuel ratio is not well-controlled and lean or rich air to fuel ratios do not hinder drivability and result in engine stumbles or hesitations. By adjusting canister purge flow at robust conditions of pre-chamber ignition, canister vapor concentration may be determined and canister purging may be completed in a shorter time frame.

As one example, the canister purge flow may be ramped at engine operating conditions wherein pre-chamber ignition is robust and canister purge flow may be maintained at engine operating conditions wherein pre-chamber ignition is non-robust at non-steady state operating conditions. More specifically, the canister purge flow may be controlled via the gradual ramping described above at engine operating conditions wherein pre-chamber ignition is non-robust as to not hinder drivability due to lean operation or rich operation of the engine.

As another example, after determining the canister vapor concentration at robust pre-conditions and non-robust conditions of pre-chamber ignition, canister purge flow may be adjusted at non-steady state operating conditions. In particular, at non-robust conditions of pre-chamber ignition, the canister purge flow may be ramped to a first canister purge flow magnitude. At robust conditions of pre-chamber ignition, the canister purge flow may be ramped to a second canister purge flow magnitude wherein the second canister purge flow magnitude exceeds that of the first canister purge flow magnitude. In this way, canister purging may be completed in a shorter time frame and may reduce the frequency of bleed emissions.

In another example, canister purge flow may be adjusted at steady state operating conditions to maintain a degree of robustness and/or increase the degree of robustness at steady state operating conditions for an engine system comprising a passive pre-chamber. Further, canister purge flow, quantity of air, and quantity of fuel may be adjusted at steady state operating conditions to increase combustion stability and the degree of robustness for an engine system comprising an active pre-chamber.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for controlling purging of a fuel vapor storage canister positioned in an evaporative emissions system of a vehicle, based on indications as to whether the pre-chamber is operating at robust conditions or non-robust conditions. The systems and methods may in some examples may be conducted at steady state and non-steady state operating conditions of the engine. The systems and methods include determining robust conditions for pre-chamber ignition to adjust canister purge flow during purging events in response to determining pre-chamber ignition is operating at robust conditions or non-robust conditions.

Figure 1:
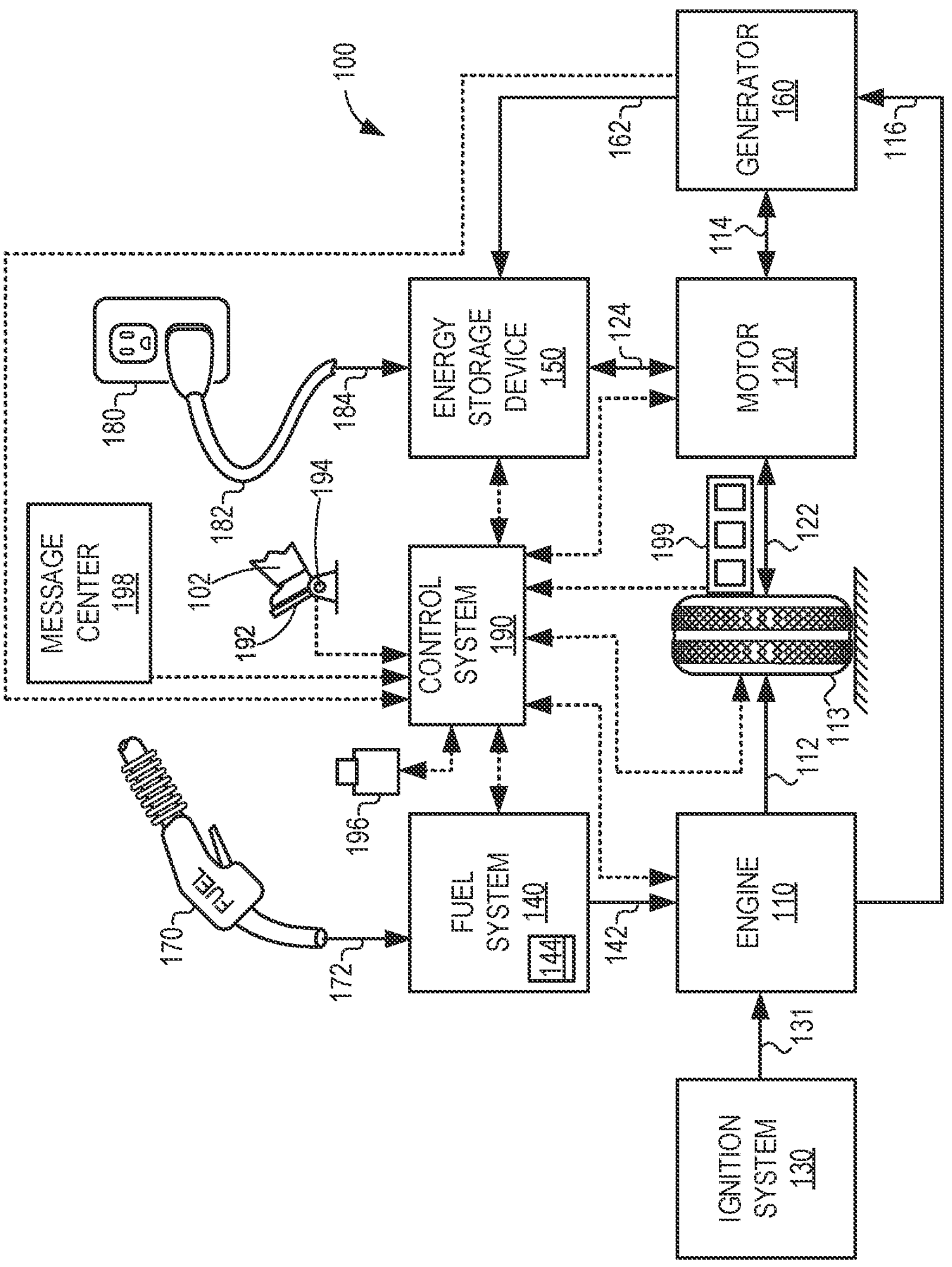
FIG. 1 schematically shows an example vehicle propulsion system.
Figure 2:
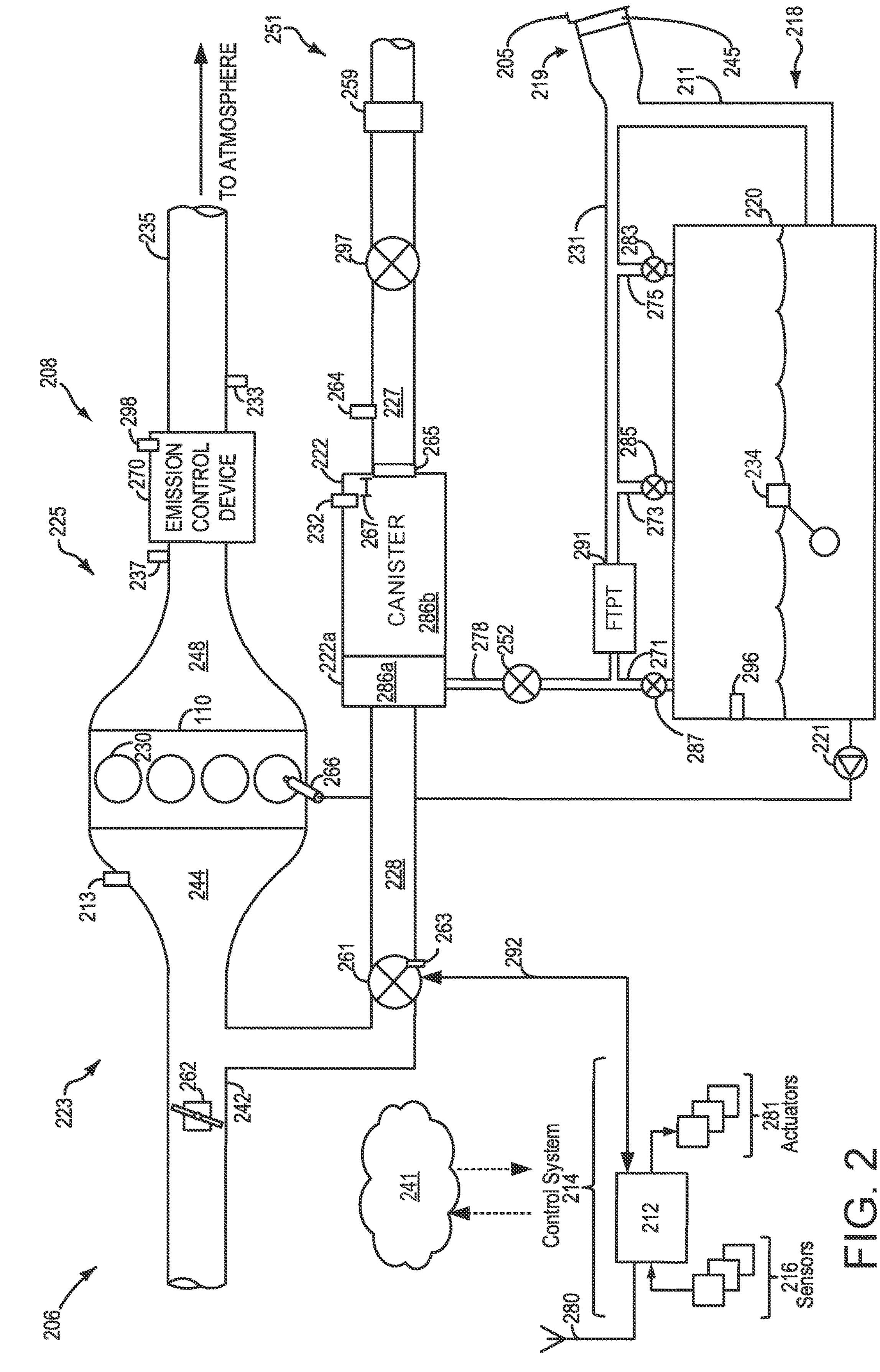
FIG. 2 schematically shows an example vehicle system comprising an engine system coupled to a fuel system and an evaporative emissions system.
Figure 3:
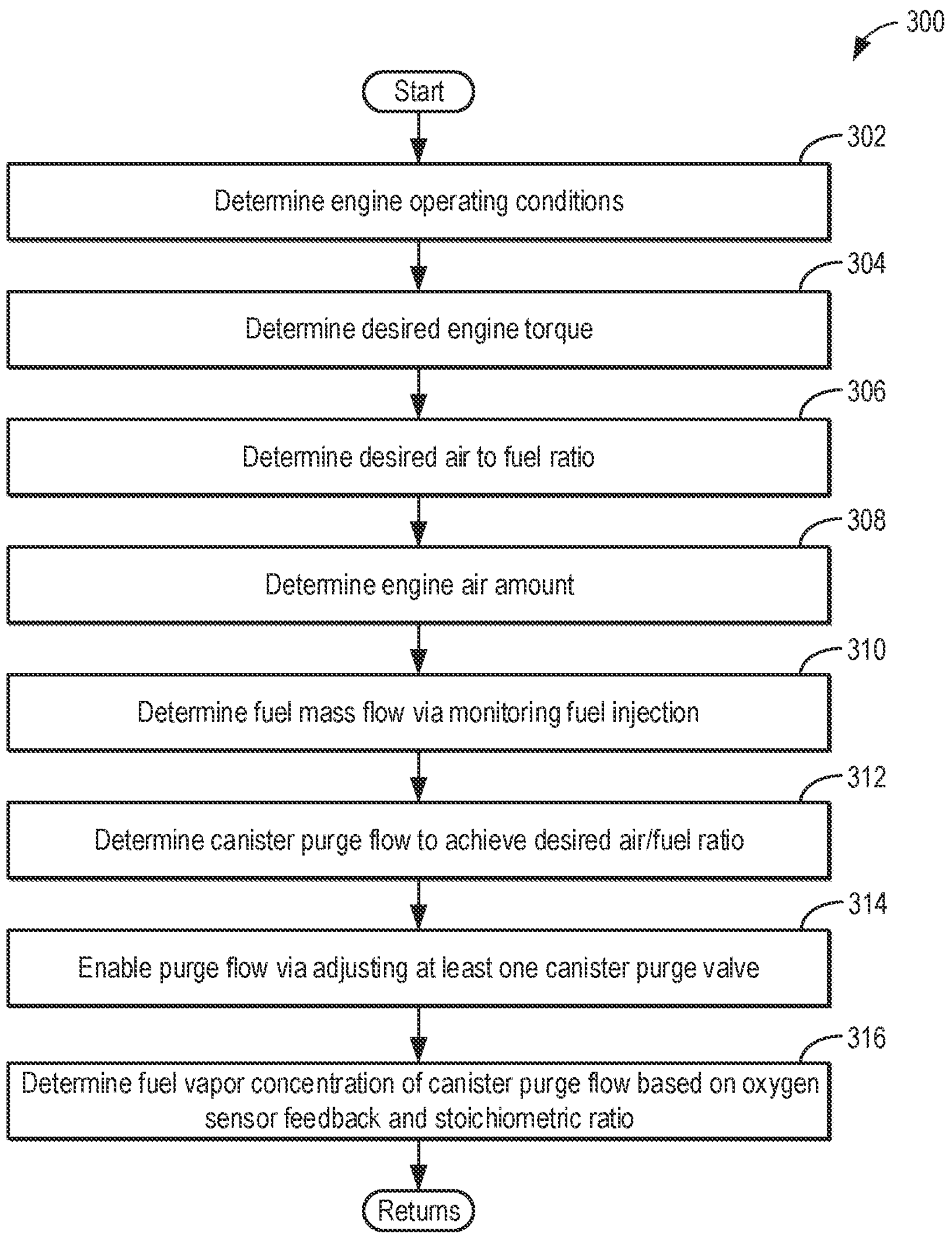
FIG. 3 shows a method for determining canister purge flow vapor concentration.
Figure 4:
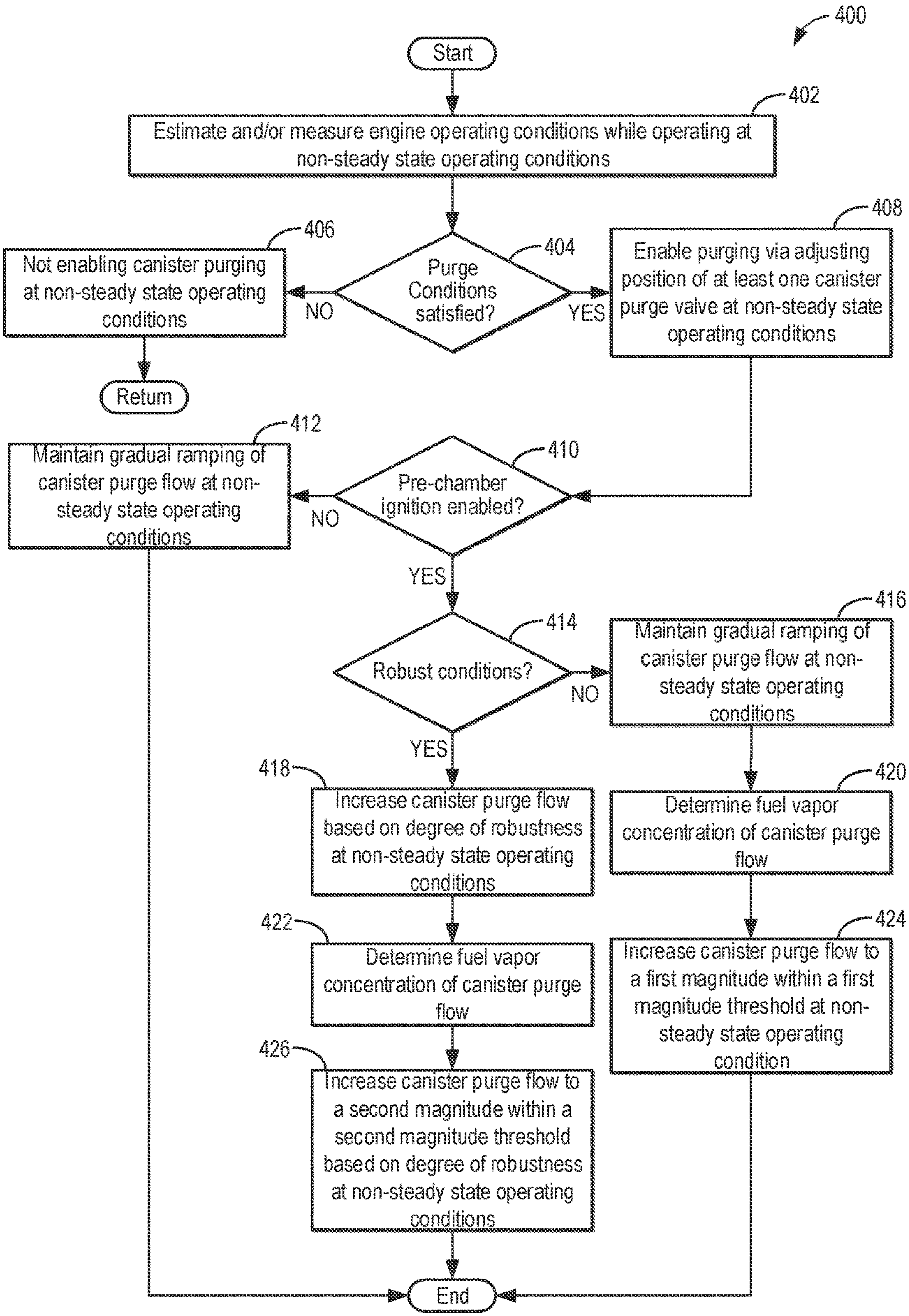
FIG. 4 shows a method for adjusting canister purge flow based on robustness of a pre-chamber at non-steady state operating conditions.
Figure 5:
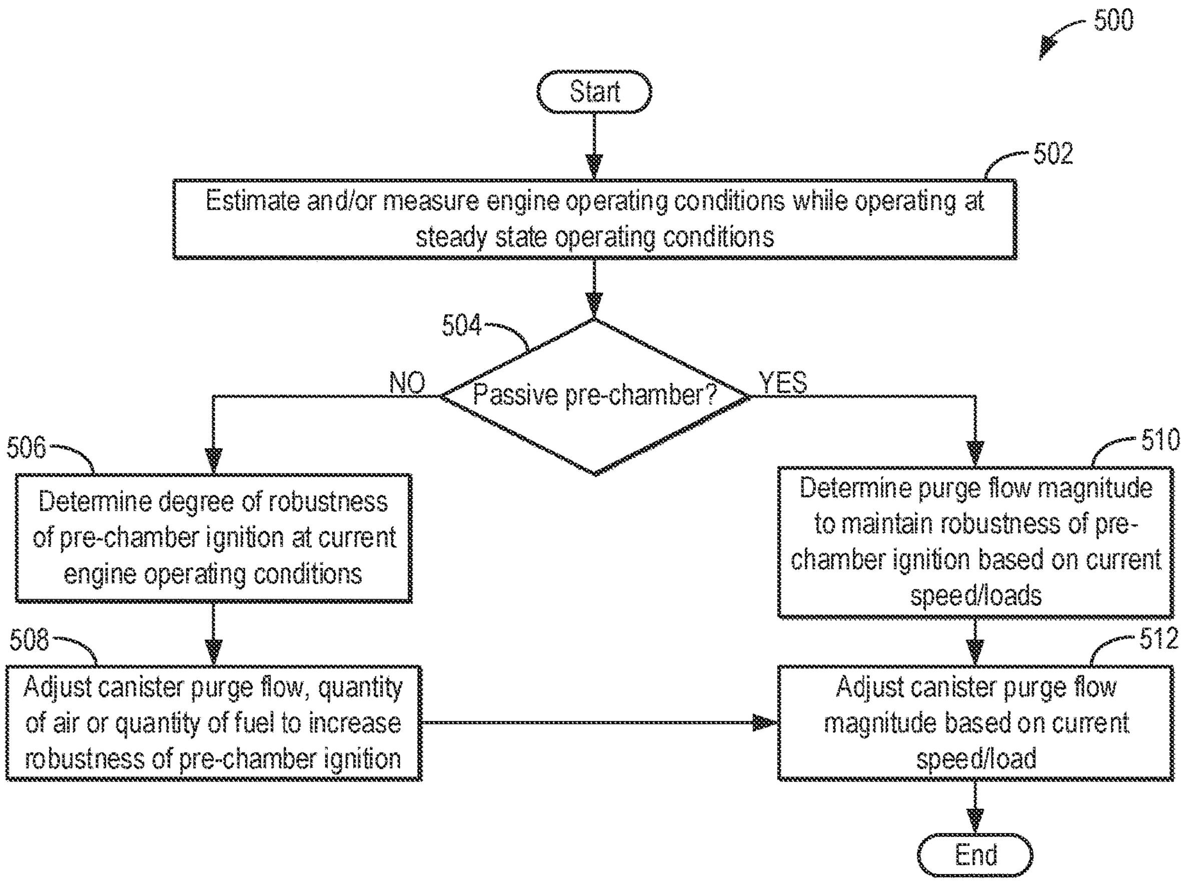
FIG. 5 shows a method for adjusting canister purge flow based on robustness of a pre-chamber at steady state operating conditions.
Figure 6:
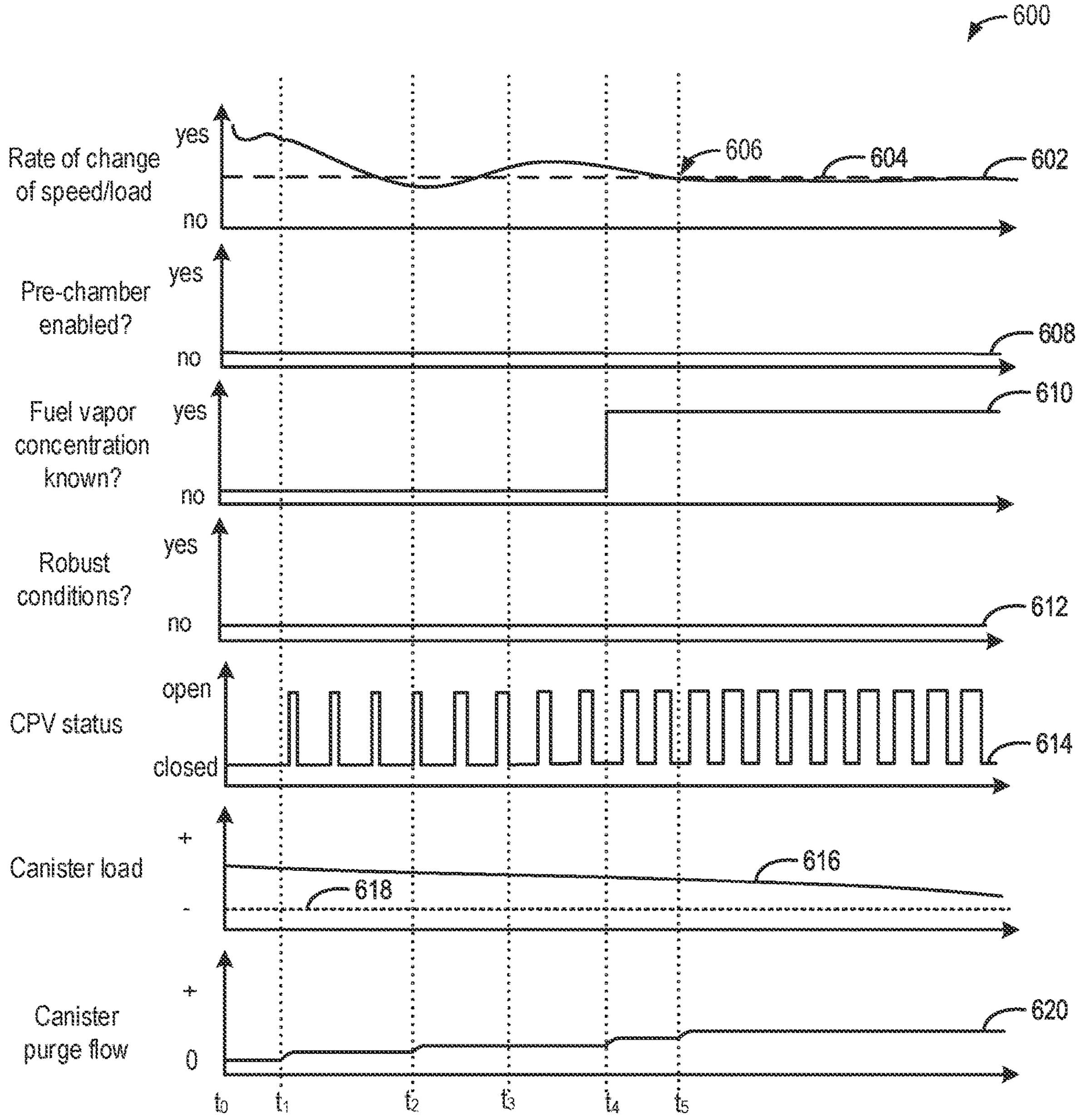
FIG. 6 shows a timing diagram for a canister purging event wherein pre-chamber ignition is not enabled during canister purging.
Figure 7:
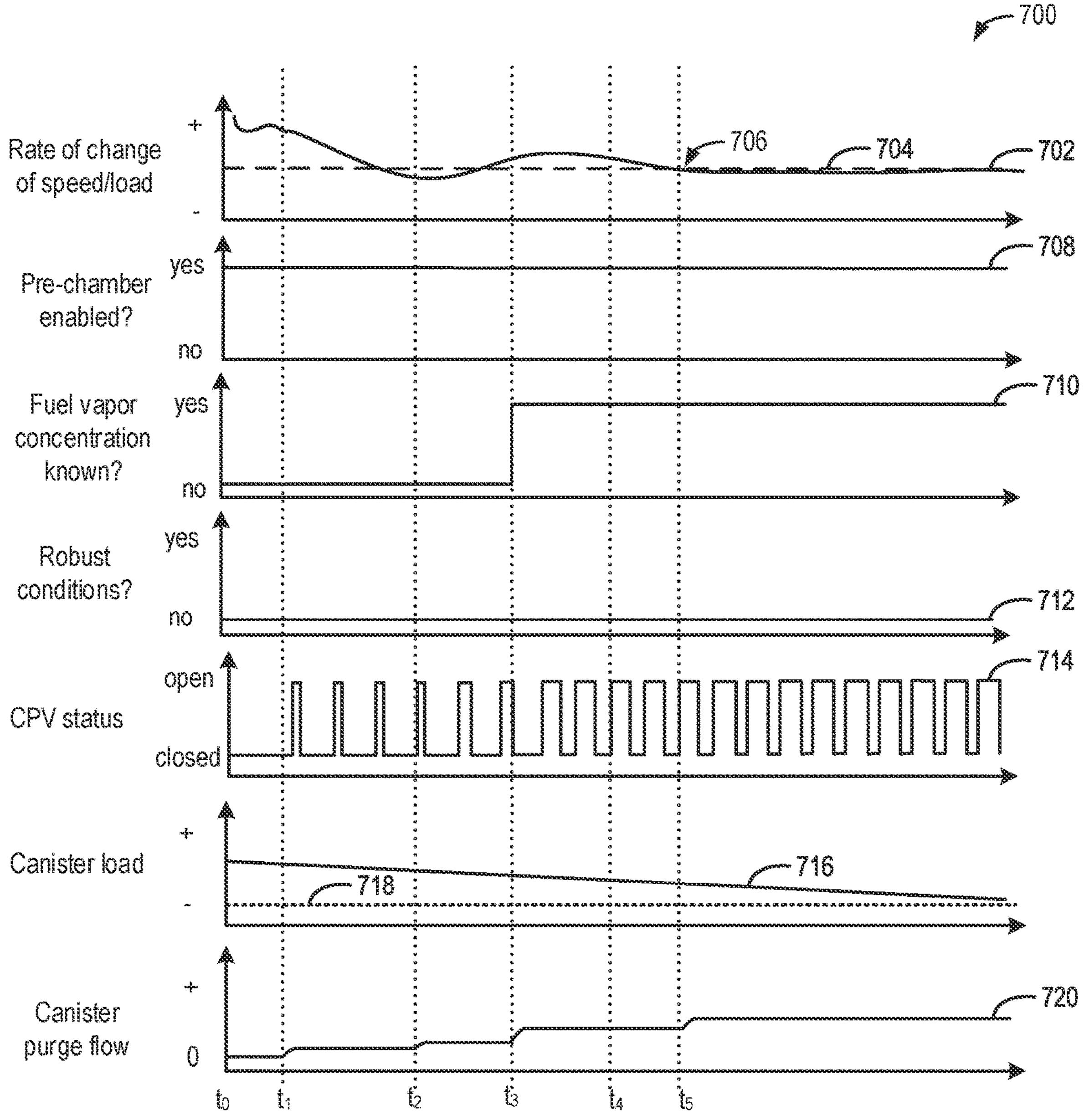
FIG. 7 shows a timing diagram for a canister purging event wherein canister purging is not based on pre-chamber ignition being non-robust.
Figure 8:
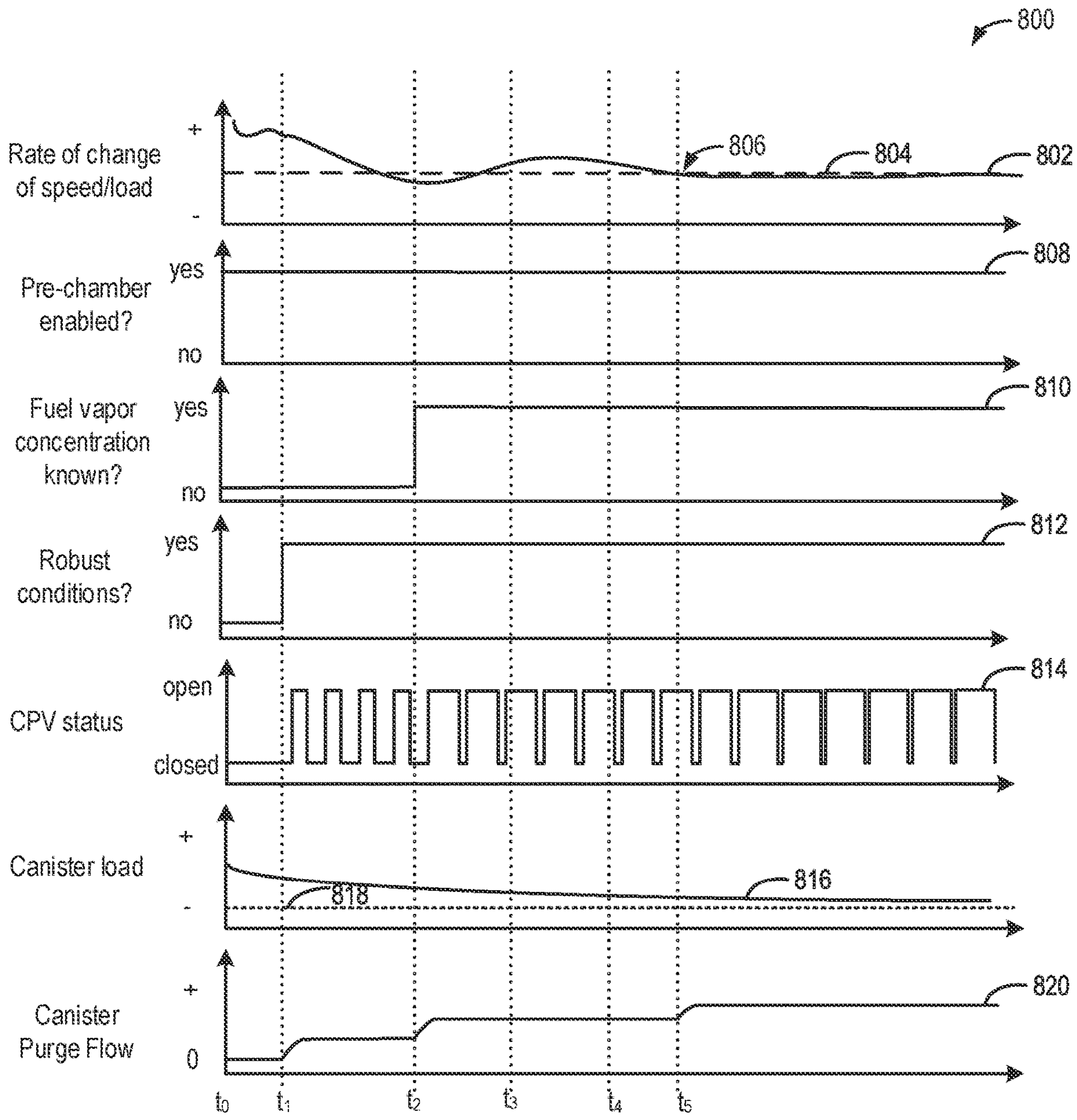
FIG. 8 shows a timing diagram for a canister purging event wherein canister purging is based on pre-chamber ignition being robust.

Accordingly, such systems and methods relate to hybrid electric vehicles, such as the hybrid electric vehicle system of FIG. 1. FIG. 2 provides details of an engine system selectively coupled to an evaporative emissions system and fuel system. FIG. 3 depicts a method for learning fuel vapor concentration of the canister purge flow. As shown in FIG. 4, a method for adjusting canister purge flow at non-steady state operating conditions of the engine. FIG. 5 depicts a method for adjusting canister purge flow at steady state operating conditions of the engine. FIG. 6 illustrates a timing diagram for an engine without pre-chamber ignition enabled. FIG. 7 depicts a timing diagram for an engine with pre-chamber ignition enabled while operating at non-robust conditions of pre-chamber ignition. In contrast, FIG. 8 depicts a timing diagram for an engine with pre-chamber ignition enabled while operating at robust conditions of pre-chamber ignition.

Turning now to the figures, FIG. 1 illustrates an example vehicle propulsion system 100. Vehicle propulsion system 100 includes an engine 110 that burns fuel and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, vehicle propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e., set to a deactivated state) where combustion of fuel at the engine is discontinued. For example, under select operating conditions, motor 120 may propel the vehicle via drive wheel 113 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 113 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some examples. However, in other examples, generator 160 may instead receive wheel torque from drive wheel 113, where the generator may convert the kinetic energy of the vehicle to electrical energy for storage at energy storage device 150 as indicated by arrow 162.

During other operating conditions, engine 110 may be operated by combusting fuel received from fuel system 140 as indicated by arrow 142. For example, engine 110 may be operated to propel the vehicle via drive wheel 113 as indicated by arrow 112 while motor 120 is deactivated. During other operating conditions, both engine 110 and motor 120 may each be operated to propel the vehicle via drive wheel 113 as indicated by arrows 112 and 122, respectively. A configuration where both the engine and the motor may selectively propel the vehicle may be referred to as a parallel type vehicle propulsion system. Note that in some examples, motor 120 may propel the vehicle via a first set of drive wheels and engine 110 may propel the vehicle via a second set of drive wheels.

In other examples, vehicle propulsion system 100 may be configured as a series type vehicle propulsion system, whereby the engine does not directly propel the drive wheels. Rather, engine 110 may be operated to power motor 120, which may in turn propel the vehicle via drive wheel 113 as indicated by arrow 122. For example, during select operating conditions, engine 110 may drive generator 160 as indicated by arrow 116, which may in turn supply electrical energy to one or more of motors 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Engine 110 may additionally drive a smart alternator. The smart alternator may have a control voltage sensing input line stemming from energy storage device 150, which may provide a set point for alternator output as is known in the art based on an electrical load requested from the battery. Alternator output may in some examples be a function of a temperature of energy storage device 150. Electrical energy generated by the smart alternator may be routed to energy storage device 150. As discussed in further detail, smart alternator may in some examples be controlled via control system 190 to increase its output in response to conditions being met for doing so. For example, there may be certain conditions where it is desirable to increase alternator output voltage during a canister purging event so as to direct a higher voltage to a canister purge valve solenoid, which may in turn increase canister purge flow through the canister purge valve.

Ignition system 130 may produce an ignition spark in pre-chamber spark plug 131 in response to a spark advance signal SA from a controller in control system 190 under select operating modes. A timing of signal SA may be adjusted based on engine operating conditions and a driver torque demand. For example, spark may be provided at maximum brake torque (MBT) timing to maximize engine power and efficiency. The controller may input engine operating conditions, including engine speed, engine load, and exhaust gas air to fuel ratio, into a look-up table, which may output the corresponding MBT timing for the input engine operating conditions. In other examples, spark may be retarded from MBT to prevent an occurrence of knock. In still other examples, spark may be retarded from MBT to reduce engine torque, such as due to a decrease in driver-demanded torque or a transmission gear shift event, or to provide a torque reserve. When pre-chamber spark plug 131 is actuated, the air-fuel mixture within the pre-chamber may combust, the increased pressure of combustion sending jets of flame into a cylinder of engine 110 via the plurality of openings in the pre-chamber walls. The plurality of openings may be arranged such that the jets of flame are evenly distributed in the cylinder. The jets of flame may ignite the air-fuel mixture in the cylinder of engine 110, causing combustion.

Fuel system 140 may include one or more fuel tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some examples, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, ignition system 130, fuel system 140, energy storage device 150, generator 160, and message center 198. Control system 190 may receive sensory feedback information from one or more of engine 110, motor 120, ignition system 130, fuel system 140, energy storage device 150, and generator 160. Further, control system 190 may send control signals to one or more of engine 110, motor 120, ignition system 130, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal. Furthermore, in some examples control system 190 may be in communication with a remote engine start receiver (or transceiver) that receives wireless signals from a key fob having a remote start button. In other examples (not shown), a remote engine start may be initiated via a cellular telephone, or smartphone based system where a user's cellular telephone sends data to a server and the server communicates with the vehicle to start the engine.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (PHEV), whereby electrical energy may be supplied to energy storage device 150 from power source 180 via an electrical energy transmission cable 182. During a recharging operation of energy storage device 150 from power source 180, electrical energy transmission cable 182 may electrically couple energy storage device 150 and power source 180. While the vehicle propulsion system is operated to propel the vehicle, electrical energy transmission cable 182 may be disconnected between power source 180 and energy storage device 150. Control system 190 may identify and/or control the amount of electrical energy stored at the energy storage device, which may be referred to as the state of charge (SOC).

In other examples, electrical energy transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some examples, fuel tank 144 may be configured to store the fuel received from fuel dispensing device 170 until it is supplied to engine 110 for combustion. In some examples, control system 190 may receive an indication of the level of fuel stored at fuel tank 144 via a fuel level sensor (not shown at FIG. 1). The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor, and a roll stability control sensor, or inertial sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button which may be manually actuated or pressed by a vehicle operator to initiate refueling. For example, in response to the vehicle operator actuating refueling button 197, a fuel tank in the vehicle may be depressurized so that refueling may be performed.

Control system 190 may be communicatively coupled to other vehicles or infrastructures using appropriate communications technology, as is known in the art. For example, control system 190 may be coupled to other vehicles or infrastructures via a wireless network, which may comprise Wi-Fi, Bluetooth, a type of cellular service, a wireless data transfer protocol, and so on. Control system 190 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I or V2X) technology. The communication and the information exchanged between vehicles can be either direct between vehicles, or can be multi-hop. In some examples, longer range communications (e.g. WiMax) may be used in place of, or in conjunction with, V2V, or V2I2V, to extend the coverage area by a few miles. In still other examples, control system 190 may be communicatively coupled to other vehicles or infrastructures via the wireless network and the internet (e.g. cloud), as is commonly known in the art.

Vehicle propulsion system 100 may also include an on-board navigation system (for example, a Global Positioning System) that an operator of the vehicle may interact with. The navigation system may include one or more location sensors for assisting in estimating vehicle speed, vehicle altitude, vehicle position/location, etc. This information may be used to infer engine operating parameters, such as local barometric pressure. As discussed above, control system 190 may further be configured to receive information via the internet or other communication networks. Information received from the GPS may be cross-referenced to information available via the internet to determine local weather conditions, local vehicle regulations, etc. In some examples, vehicle propulsion system 100 may include lasers, radar, sonar, acoustic sensors, which may enable vehicle location, traffic information, etc., to be collected via the vehicle.

FIG. 2 shows a schematic depiction of a vehicle system 206. It may be understood that vehicle system 206 may comprise the same vehicle system as vehicle propulsion system 100 depicted at FIG. 1. The vehicle system 206 includes an engine system 208 coupled to an evaporative emissions system 251 and a fuel system 218. It may be understood that fuel system 218 may comprise the same fuel system as fuel system 140 depicted at FIG. 1. Evaporative emissions system 251 includes a purge canister 222 (or fuel vapor storage canister) which may be used to capture and store fuel vapors. In some examples, vehicle system 206 may be a hybrid electric vehicle system. However, it may be understood that the description herein may refer to a non-hybrid vehicle, for example a vehicle equipped with an engine and not a motor that can operate to at least partially propel the vehicle, without departing from the scope of the present disclosure.

The engine system 208 may include an engine 110 having a plurality of cylinders 230. The engine 110 includes an engine air intake 223 and an engine exhaust system 225. The engine air intake 223 includes a throttle 262 in fluidic communication with engine intake manifold 244 via an intake passage 242. Further, engine air intake 223 may include an air box and filter (not shown) positioned upstream of throttle 262. The engine exhaust system 225 includes an exhaust manifold 248 leading to an exhaust passage 235 that routes exhaust gas to the atmosphere. The engine exhaust system 225 may include one or more exhaust catalyst, which may be mounted in a close-coupled position in the exhaust. In some examples, an electric heater 298 may be coupled to the exhaust catalyst, and utilized to heat the exhaust catalyst to or beyond a predetermined temperature (e.g. light-off temperature). One or more emission control devices may include a three-way catalyst, lean NOx trap, diesel particulate filter, oxidation catalyst, etc. It will be appreciated that other components may be included in the engine such as a variety of valves and sensors. For example, a barometric pressure sensor 213 may be included in the engine intake. In one example, barometric pressure sensor 213 may be a manifold air pressure (MAP) sensor and may be coupled to the engine intake downstream of throttle 262. Barometric pressure sensor 213 may rely on part throttle or full or wide open throttle conditions, e.g., when an opening amount of throttle 262 is greater than a threshold, in order accurately determine BP.

Fuel system 218 may include a fuel tank 220 coupled to a fuel pump system 221. It may be understood that fuel tank 220 may comprise the same fuel tank as fuel tank 144 depicted above at FIG. 1. In some examples, the fuel system may include a fuel tank temperature sensor 296 for measuring or inferring a fuel temperature. The fuel pump system 221 may include one or more pumps for pressurizing fuel delivered to the injectors of engine 110, such as the example single injector 266 shown. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to an evaporative emissions system 251 which includes a purge canister 222 via vapor recovery line 231, before being canister purged to the engine air intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel storage tank vent valves may be positioned in conduits 271, 273, or 275. Among other functions, fuel storage tank vent valves may allow the purge canister of the evaporative emission system to be maintained at a low pressure or vacuum without increasing the fuel evaporation rate from the tank (which would otherwise occur if the fuel storage tank pressure were lowered). For example, conduit 271 may include a grade vent valve (GVV) 287, conduit 273 may include a fill limit venting valve (FLVV) 285, and conduit 275 may include a grade vent valve (GVV) 283.

Further, in some examples, vapor recovery line 231 may be coupled to a fuel filler system 219. In some examples, fuel filler system may include a fuel cap 205 for sealing off the fuel filler system from the atmosphere. Fuel filler system 219 is coupled to fuel tank 220 via a fuel filler pipe 211 (or fuel filler neck 211).

Further, fuel filler system 219 may include refueling lock 245. In some examples, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some examples, refueling lock 245 may be a filler pipe valve located at a mouth of fuel filler pipe 211. In such examples, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some examples, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In examples where refueling lock 245 is locked using an electrical mechanism, refueling lock 245 may be unlocked by commands from controller 212, for example, when a fuel tank pressure decreases below a pressure threshold. In examples where refueling lock 245 is locked using a mechanical mechanism, refueling lock 245 may be unlocked via a pressure gradient, for example, when a fuel tank pressure decreases to atmospheric pressure.

Evaporative emissions system 251 may include one or more emissions control devices, such as one or more purge canister 222, as discussed. The purge canisters may be filled with an appropriate adsorbent 286*b*, such that the canisters are configured to temporarily trap fuel vapors (including vaporized hydrocarbons) during fuel tank refilling operations and during diagnostic routines, as will be discussed in detail below. In one example, the adsorbent 286*b* used is activated charcoal. Evaporative emissions system 251 may further include a canister ventilation path or vent line 227 which may route gases out of the purge canister 222 to the atmosphere when storing, or trapping, fuel vapors from fuel system 218.

Purge canister 222 may include buffer 222*a* (or buffer region), each of the canister and the buffer comprising the adsorbent. As shown, the volume of buffer 222*a* may be smaller than (e.g., a fraction of) the volume of purge canister 222. The adsorbent 286*a* in the buffer 222*a* may be same as, or different from, the adsorbent in the canister (e.g., both may include charcoal). Buffer 222*a* may be positioned within purge canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more canister temperature sensors 232 may be coupled to and/or within purge canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and canister load may be estimated based on temperature changes within the canister. In some examples, a canister temperature sensor 232 may be positioned within a threshold distance 267 of a vent port 265 of the canister. Such a canister temperature sensor may be used to indicate circumstances where fuel vapors may be escaping from the fuel vapor storage canister to atmosphere. For example, a canister temperature increase as monitored via the canister temperature sensor 232 positioned within the threshold distance 267 of the vent port 265 may be indicative of fuel vapors bleeding through purge canister 222 to atmosphere.

Vent line 227 may also allow fresh air to be drawn into purge canister 222 when purging stored fuel vapors from fuel system 218 to engine air intake 223 via canister purge line 228 and canister purge valve 261. For example, canister purge valve 261 may be normally closed but may be opened during certain conditions so that vacuum from engine intake manifold 244 is provided to the purge canister for purging. In some examples, vent line 227 may include an air filter 259 disposed therein upstream of a purge canister 222.

In some examples, the flow of air and vapors between purge canister 222 and the atmosphere may be regulated by a canister vent valve (CVV) 297 coupled within vent line 227. When included, the canister vent valve 297 may be a normally open valve. In some examples, a vapor bypass valve (VBV) 252 may be positioned between the fuel tank and the purge canister 222 within conduit 278. However, in other examples VBV 252 may not be included without departing from the scope of this disclosure. Where included, VBV 252 may include a notch opening or orifice, such that even when closed, the fuel tank may be allowed to vent pressure through said notch opening or orifice. A size of the notch opening or orifice may be calibratable. In one example, the notch opening or orifice may comprise a diameter of 0.09", for example. During regular engine operation, VBV 252 may be kept closed to limit the amount of diurnal or "running loss" vapors directed to purge canister 222 from fuel tank 220. During refueling operations, and selected purging conditions, VBV 252 may be temporarily opened, e.g., for a duration, to direct fuel vapors from the fuel tank 220 to purge canister 222. While the depicted example shows VBV 252 positioned along conduit 278, in alternate embodiments, the VBV may be mounted on fuel tank 220. Due to the notch opening or orifice associated with VBV 252, fuel vapors stemming from the fuel tank may continue to load purge canister 222 under conditions where a fuel vaporization rate is high (e.g. greater than a threshold fuel vaporization rate).

Thus, fuel system 218 may be operated by controller 212 in a plurality of modes by selective adjustment of the various valves and solenoids. It may be understood that control system 214 may comprise the same control system as control system 190 depicted above at FIG. 1. For example, the fuel system may be operated in a fuel vapor storage mode (e.g., during a fuel tank refueling operation and with the engine not combusting air and fuel), wherein the controller 212 may command VBV 252 (where included) to an open configuration while closing canister purge valve (CPV) 261 to direct refueling vapors into purge canister 222 while preventing fuel vapors from being directed into the intake manifold.

As another example, the fuel system may be operated in a refueling mode (e.g., when fuel tank refueling is requested by a vehicle operator), wherein the controller 212 may command VBV 252 (where included) to the open configuration while maintaining canister purge valve 261 closed, to depressurize the fuel tank before allowing enabling fuel to be added therein. As such, VBV 252 (where included) may be maintained in the open configuration during the refueling operation to allow refueling vapors to be stored in the canister. After refueling is completed, the VBV (where included) may be commanded closed.

As yet another example, the fuel system may be operated in a canister purging mode (e.g., after an emission control device light-off temperature has been attained and with the engine combusting air and fuel), wherein the controller 212 may open or duty cycle CPV 261 while commanding VBV 252 (where included) to a closed configuration and commanding CVV 297 open. Herein, the vacuum generated by the intake manifold of the operating engine may be used to draw fresh air through vent line 227 and through purge canister 222 to canister purge the stored fuel vapors into engine intake manifold 244. In this mode, the canister purged fuel vapors from the canister are combusted in the engine. The purging may be continued until the stored fuel vapor amount in the canister is below a threshold. In some examples, purging may include additionally commanding VBV 252 (where included) to the open position such that fuel vapors from the fuel tank may additionally be drawn into the engine for combustion. It may be understood that such purging of the canister may further include commanding or maintaining open CVV 297.

In some examples, CVV 297 may be a solenoid valve wherein opening or closing of the valve is performed via actuation of a canister vent solenoid. In particular, the canister vent valve may be a normally open valve that is closed upon actuation of the canister vent solenoid. In some examples, CVV 297 may be configured as a latchable solenoid valve. In other words, when the valve is placed in a closed configuration, it latches closed without requiring additional current or voltage. For example, the valve may be closed with a 100 ms pulse, and then opened at a later time point with another 100 ms pulse. In this way, the amount of battery power required to maintain the CVV closed may be reduced.

Similarly, CPV 261 may be a solenoid valve wherein opening or closing of the CPV is performed via actuation of a canister purge valve solenoid 263. The CPV may be a normally closed valve that is opened upon actuation of the canister purge valve solenoid. In some examples, a voltage monitor line 292 may communicatively couple the CPV (and canister purge valve solenoid) to controller 212. The voltage monitor line 292 may be an analog voltage monitor line, for example. The voltage monitor line 292 may be used to quantify an inherent voltage drop across the wiring and connection from the electrical energy source (e.g. energy storage device 150) to the canister purge valve solenoid, in order to infer whether there is a degraded voltage supply to CPV 261. For example, a baseline voltage drop across the wiring and connection to the CPV may be determined under conditions where the wiring and connection is new or just installed, and then may periodically retrieve additional information pertaining to the voltage drop as time goes by during the life cycle of the vehicle. By comparing the voltage drop at periodic time points to the baseline voltage drop, controller 212 may infer whether there is a degraded voltage supply to the canister purge valve solenoid for actuating the CPV.

Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device 270, temperature sensor 233, pressure sensor 291, canister temperature sensor 232 and hydrocarbon sensor 264. The hydrocarbon sensor 264 may be used to infer breakthrough of hydrocarbons from purge canister 222, for example. Other sensors such as pressure, temperature, air/fuel ratio, and composition sensors may be coupled to various locations in the vehicle system 206. As another example, the actuators may include throttle 262, VBV 252 (where included), canister purge valve 261 (e.g. canister purge valve solenoid 263), and canister vent valve 297 (canister vent valve solenoid, not shown). Controller 212 may receive input data from the various sensors, process the input data, and trigger the actuators in response to the processed input data based on instruction or code programmed therein corresponding to one or more routines. Example control routines are described herein with regard to FIGS. 3-5.

Undesired evaporative emissions detection routines may be intermittently performed by controller 212 on fuel system 218 and/or evaporative emissions system 251 to confirm that undesired evaporative emissions are not present in the fuel system and/or evaporative emissions system. One example test diagnostic for undesired evaporative emissions includes application of engine manifold vacuum on the fuel system and/or evaporative emissions system that is otherwise sealed from atmosphere, and in response to a threshold vacuum being reached, sealing the evaporative emissions system from the engine and monitoring pressure bleed-up in the evaporative emissions system to ascertain a presence or absence of undesired evaporative emissions. In some examples, engine manifold vacuum may be applied to the fuel system and/or evaporative emissions system while the engine is combusting air and fuel. In other examples, the engine may be commanded to be rotated unfueled in a forward direction (e.g. the same direction the engine rotates when combusting air and fuel) to impart a vacuum on the fuel system and/or evaporative emissions system. In still other examples, a pump (not shown) positioned in vent line 227 may be relied upon for applying a vacuum on the fuel system and/or evaporative emissions system.

Controller 212 may further include wireless communication device 280, to enable wireless communication between the vehicle and other vehicles or infrastructures, via wireless network 241.

Turning to FIG. 3, a method 300 for determining the fuel vapor concentration of a canister purge flow entering an engine system from an evaporative emissions system. For example, determining the vapor concentration of the canister purge flow may include determining desired torque and the air to fuel ratio to achieve the desired torque based on engine operating conditions. The evaporative emissions system and engine system may be the systems described above with respect to FIG. 2. Instructions for carrying out method 300 may be executed by a controller, such as controller 212 of FIG. 2, based on instructions stored on a memory of the controller and in conjunction with signals received from sensors of the engine system, such as the sensors described with reference to FIG. 1. The controller may employ engine actuators of the engine system to adjust engine operation according to the methods described below.

At 302, the method 300 includes determining engine operating conditions. Engine operating conditions may be measured and/or estimated. For example, the engine operating conditions may include a plurality of parameters, such as engine coolant temperature, catalyst temperature, time between engine operation (e.g., soak time), engine speed, torque demand, manifold absolute pressure (MAP), barometric pressure (BP), and the like. The plurality of parameters may influence engine operation in different ways depending on the state of the plurality of parameters. As one example, normal engine coolant temperatures may result in stoichiometric air to fuel ratios whereas low engine coolant temperature or high engine coolant temperatures may result in non-stoichiometric air to fuel ratios. At 304, the method 300 includes determining desired engine torque. The desired torque may be based on driver request, engine speed, gear ratio, cruise control, traction control, vehicle stability control, and the like.

At 306, the method 300 includes determining desired air to fuel ratio. A particular desired air to fuel ratio may be realized to provide the desired torque at particular values of the plurality of parameters. As one example, the desired air to fuel ratio may be selected based on achieving a stoichiometric ratio between air and fuel. At 308, the method 300 includes determining engine air amount. The quantity of air may be inferred via an exhaust gas oxygen sensor upstream from the evaporative emissions system. At 310, the method 300 includes determining fuel mass flow via monitoring fuel injection. A routine executed by a controller may determine the amount of fuel injected into the engine based on readings from a plurality of sensors (e.g, sensors 216 in FIG. 2).

At 312, the method 300 includes determining canister purge flow to achieve the desired air to fuel ratio. The routine may calculate the amount of fuel in the purge canister based on a plurality of parameters, such as parameters from other systems in the vehicle including the fuel system and evaporative emissions system. In particular, a fuel tank pressure transducer may monitor fuel tank pressure and a canister temperature sensor may be positioned in the fuel vapor storage canister within a threshold distance of a vent port of the fuel vapor storage canister.

In this way, a fuel vaporization rate of fuel in a fuel tank may be monitored via the fuel tank pressure transducer and the canister temperature sensor. A hydrocarbon sensor may be positioned in a vent line that couples the fuel vapor storage canister to atmosphere to indicate that fuel vapors are migrating into the vent line. As such, the amount of fuel in the purge canister may be determined based on data received from the plurality of sensors. The routine may use the amount of fuel in the purge canister to determine a canister purge flow that will realize the desired air to fuel ratio in the engine.

At 314, the method 300 includes enabling canister purge flow via adjusting at least one canister purge valve if not enabled. As one example, wherein canister purge flow is enabled due to purge criteria being satisfied, such as canister purge flow being requested, the routine may optionally adjust the canister purge valve to an open position, enabling fuel vapors to flow into the engine. In some embodiments, the canister purge valve may be adjusted to provide a desired amount of purge flow into the intake manifold. The desired amount of purge flow may include gradually ramping the purge flow or adjusting the flow based on the engine operating conditions.

At 316, the method 300 includes determining fuel vapor concentration of canister purge flow based on exhaust gas oxygen sensor feedback and stoichiometric ratio. The controller stores instructions to learn a concentration of fuel vapors being inducted to the engine during the canister purging event based on at least in part on output from the exhaust gas oxygen sensor. The routine may calculate the fuel vapor concentration of the canister purge flow based on at least in part on output from the exhaust gas oxygen sensor feedback and the stoichiometric ratio. Additionally, output from a plurality of sensors may be utilized to determine the fuel vapor concentration of canister purge flow. Accordingly, the routine, when executed, may cause a controller to adjust the actuator communicatively coupled to the canister purge valve to adjust the canister purge flow based on the fuel vapor concentration to achieve the desired air to fuel ratio to realize the desired torque production. The method 300 then returns.

FIG. 4 and FIG. 5 include methods for adjusting canister purge flow based on robustness conditions of pre-chamber ignition at non-steady state and steady state operating conditions. Non-steady state operating conditions may include the engine not operating within rate of change threshold wherein a change in speed/load of the engine per unit time may not be within the rate of change threshold. Steady state operating conditions may include the engine operating within a rate of change threshold wherein the change in speed/load of the engine per unit time may be within the rate of change threshold.

FIG. 4 shows a method 400 for adjusting canister purge flow based on robustness conditions of pre-chamber ignition of an engine at non-steady steady operating conditions. For example, robustness conditions may comprise speed-load thresholds and purge flow magnitude thresholds wherein lean and rich operation of the engine does not hinder engine performance (e.g., reduces the frequency of engine hesitations). The evaporative emissions system and engine system may be the systems described above with respect to FIG. 2. Instructions for carrying out method 400 may be executed by a controller, such as controller 212 of FIG. 2, based on instructions stored on a memory of the controller and in conjunction with signals received from sensors of the engine system, such as the sensors described with reference to FIG. 1. The controller may employ engine actuators of the engine system to adjust engine operation according to the methods described below.

At 402, the method 400 includes estimating and/or measuring engine operating conditions while operating at non-steady state conditions. Engine operating conditions may include a plurality of parameters, such as engine coolant temperature, catalyst temperature, time between engine operation (e.g., soak time), engine speed, torque demand, manifold absolute pressure (MAP), barometric pressure (BP), and the like. The plurality of parameters may influence engine operation in different ways depending on the state of the plurality of parameters. Accordingly, the plurality of parameters may affect robustness of pre-chamber ignition at non-steady state operating conditions.

At 404, the method 400 includes determining whether canister purge conditions are satisfied. A controller, communicatively coupled to a plurality of sensors and actuators, with computer readable instructions stored on non-transitory memory that when executed, may cause the controller to not enable a canister purging event in response to an indication that canister purging conditions are not satisfied and enable the canister purging event via adjusting a canister purge valve in response to an indication that canister purging conditions are satisfied at non-steady state.

Further, the routine may determine that various operating conditions, such as speed, load, temperature, etc., indicate that a canister purging event wherein the fuel vapor concentration of the canister purge flow is unknown may not result in undesirable engine performance (e.g., engine hesitations and stalls) at non-steady state operating conditions. In another example, the routine may request the canister purging event responsive to purge canister loads that are correlated with an increase in bleed emissions that do not satisfy environmental standards. In this way, the routine may determine whether existing operating conditions result in desirable engine and vehicle performance at non-steady state operating conditions. Responsive to determining that canister purging conditions are not satisfied based on engine operating conditions, the method 400 includes not enabling canister purge flow at 406. As such, the canister purge valve is not adjusted to enable flow to the engine. Instead, the engine combusts fuel injected from the fuel tank system. The method 400 then returns.

In contrast, responsive to determining that canister purging conditions are enabled based on engine operating conditions, the method 400 includes enabling canister purging via adjusting at least one canister purge valve at 408. The routine may adjust the canister purge valve to an open position, enabling canister purge flow. The canister purge valve may be duty cycled according to a staircase function to enable gradual ramping of purge flow to within an empirically determined purge flow magnitude threshold to increase canister purge flow at non-steady state operating conditions.

At 410, the method 400 includes determining whether pre-chamber ignition is enabled. Pre-chamber ignition may not operate efficiently at certain engine operating conditions under non-steady state operating conditions. For example, lean operation (e.g., low level of fuel and oxygen) may affect combustion stability (e.g., ignitability) and may increase an incidence of misfire. The routine may enable pre-chamber ignition based on the measured and/or estimated operating conditions of the engine correlated with desired pre-chamber ignition operation.

Responsive to a disabled pre-chamber ignition, the method 400, the method 400 includes maintaining gradual ramping of canister purge flow at 412. As described herein, lean operation or rich operation (e.g., combustion) of the engine may result in undesirable performance of the engine, such as hesitation and stumbles. The routine may continue the gradual ramping of canister purge flow via the canister purge valve to within the empirically determined canister purge flow threshold at non-steady state operating conditions. In this way, desired performance of the engine may be maintained and bleed emissions may be reduced while fuel vapor concentrations of the canister purge flow are unknown and canister purge flow based on the desired air to fuel and torque output is not feasible. The method 400 then returns.

Responsive to an enabled pre-chamber ignition, the method 400 includes determining whether pre-chamber ignition is operating at robust conditions at 414. The routine may determine that the current operating conditions of the various systems and components described with respect to FIG. 1 and FIG. 2 indicate that pre-chamber ignition is operating at speed/load threshold wherein engine operation does not experience performance events (e.g., engine hesitations) wherein operability of a vehicle is affected significantly and torque production is hindered. In particular, in some embodiments, robust conditions at non-steady state operating conditions may comprise operating conditions wherein the engine operates at air to fuel ratios that are under or exceed stoichiometric ratios without experiencing performance events.

Responsive to robustness conditions not being satisfied, the method 400 includes maintaining gradual ramping of canister purge flow at 416. As described above, the routine wherein the adjustment of the canister purge valve that enables gradual ramping of canister purge flow may result in reduction of undesirable bleed emissions without significantly affecting engine operation and vehicle driving performance. At 420, the method 400 includes determining fuel vapor concentration of the canister purge flow at non-steady state operating conditions. The controller may store instructions to learn a concentration of fuel vapors being inducted to the engine during the canister purging event based on at least in part on output from the exhaust gas oxygen sensor. Similar to the routine described above with respect to FIG. 3, the fuel vapor concentration of the canister purge flow may be determined via a routine based on at least in part on output from the exhaust gas oxygen sensor and a plurality of other sensors to determine the fuel vapor concentration of the canister purge flow.

At 424, the method 400 includes increasing canister purge flow to a first magnitude within a first purge flow magnitude threshold. As such, the controller may store instructions to a duty cycle of the canister purge valve to establish a first canister purge flow magnitude within a first canister purge flow magnitude threshold at non-robust pre-chamber ignitions responsive to learning concentration of fuel vapors being inducted to the engine at non-steady-state operating conditions.

The first canister purge flow magnitude may comprise a canister purge flow at non-robust conditions for pre-chamber ignition that does not result in undesirable engine performance at non-steady state operating conditions. In some embodiments, the first canister purge flow magnitude may be based on the operating conditions of the engine system, the evaporative emission systems, and the fuel tank system in addition to speed/load of the engine to achieve the desired torque production. In this way, a canister purge event may occur wherein the fuel vapor of purge canister enters the engine at non-robust conditions under non-steady state operating conditions without it affecting engine performance significantly and may reduce the frequency of bleed emissions produced by the vehicle system. The first canister purge flow magnitude may be realized via adjusting the canister purge valve accordingly.

Responsive to robustness conditions being satisfied, the method 400 includes increasing canister purge flow based on degree of robustness at 418. Canister purge flow may be adjusted proportionally based on a degree of robustness of the robustness conditions at non-steady state operating conditions. The degree of robustness may comprise speed/load thresholds at pre-determined canister purge flow magnitude thresholds wherein engine operation does not experience performance events that hinder performance, such as hesitations or stumbles.

For example, different canister purge flow magnitudes and different speed/loads of the engine at different non-steady state operating conditions may correlate to different degrees of robustness. In particular, certain speed/loads may allow for a particular canister purge flow magnitude being higher or lower. As such, the canister purge valve may be adjusted accordingly to realize the canister purge flow magnitude associated with a particular degree of robustness. As such, the time to empty the purge canister during the canister purging event may decrease which may reduce the frequency of bleed emissions. Additionally, the time to determine fuel vapor concentration of the canister purge flow may be reduced due to increasing canister purge flow proportionally based on robustness. In some embodiments, the plurality of sensors utilized in determining fuel vapor concentration may be more sensitive at higher canister purge flows and may result in sensor output being obtained sooner.

At 422, the method 400 includes determining the fuel vapor concentration of the canister purge flow. As described herein, the fuel vapor concentration of the canister purge flow may be determined via a routine executed by the controller that utilizes output from exhaust gas oxygen sensors and a plurality of other sensors to determine the fuel vapor concentration of the canister purge flow. At 426, the method 400 includes increasing canister purge flow to a second canister purge flow magnitude within a second pre-determined magnitude threshold based on degree of robustness. As such, the controller may store instructions to a duty cycle of the canister purge valve to establish a second canister purge flow magnitude within a second canister purge flow magnitude at robust conditions of pre-chamber ignition responsive to learning concentration of fuel vapors being inducted to the engine at non-steady-state operating conditions.

The second canister purge flow magnitude may comprise a canister purge flow at robust conditions for pre-chamber ignition that does not result in undesirable engine performance at non-steady state operating conditions. The second canister purge flow magnitude may be greater than the first canister purge flow magnitude. In some embodiments, the second canister purge flow magnitude may be based on the operating conditions of the engine system, the evaporative emission systems, and the fuel tank system in addition to speed/load of the engine to achieve the desired torque production. In this way, a canister purge event may occur wherein the fuel vapor of purge canister enters the engine at robust conditions under non-steady state operating conditions without it affecting engine performance significantly and may reduce the frequency of bleed emissions produced by the vehicle system. The second canister purge flow magnitude may be realized via adjusting the canister purge valve accordingly. The method 400 then ends.

FIG. 5 shows a method 500 for evaluating robustness of pre-chamber ignition based on speed/load thresholds of an engine and canister purge flow magnitude thresholds at steady state operating conditions and adjusting canister purge flow based on the evaluated robustness at steady state operating conditions. In some embodiments, the system described above with respect to FIGS. 1 and 2 may include a passive pre-chamber. In other embodiments, the systems described above may include an active pre-chamber comprising a spark plug and a fuel injector. Instructions for carrying out method 500 may be executed by a controller, such as controller 212 of FIG. 2, based on instructions stored on a memory of the controller and in conjunction with signals received from sensors of the engine system, such as the sensors described with reference to FIG. 2. The controller may employ engine actuators of the engine system to adjust engine operation according to the methods described below.

At 502, the method 500 includes estimating and/or measuring engine operating conditions while operating at steady state conditions. The engine operating conditions may include the plurality of parameters described above with respect to FIG. 3 and FIG. 4. The plurality of parameters may affect engine operation differently depending on whether the engine operation occurs at non-steady state operating conditions or steady state operating conditions. Further, the plurality of parameters may influence engine operation in different ways depending on the state of the plurality of parameters under steady state operating conditions. Accordingly, the plurality of parameters may affect robustness of pre-chamber ignition at steady state operating conditions.

At 504, the method 500 includes determining whether pre-chamber ignition is operating with a passive pre-chamber. A routine may identify whether the system utilizes a passive pre-chamber or an active pre-chamber for pre-chamber ignition. Robustness conditions may be different based on whether an engine and pre-chamber ignition is operating with a passive pre-chamber or active pre-chamber under steady state operating conditions. In this way, speed/load thresholds and canister purge flow magnitude thresholds with similar degrees of robustness may be determined separately for engines with passive pre-chambers and active-pre chamber. Similar degrees of robustness may comprise averaged speed/load thresholds and averaged flow magnitudes that have similar engine performance without engine hesitations occurring.

Responsive to engine operation with an active pre-chamber, the method 500 includes determining the degree of robustness of pre-chamber ignition at current engine operating conditions at 506. The routine may utilize the plurality of parameters described above to assess the degree of robustness of pre-chamber ignition at the current operating conditions. In some embodiments, the current operating conditions may be indicative of pre-chamber ignition with a lower degree of robustness. In other embodiments, the current operating conditions may be indicative of pre-chamber ignition with a higher degree of robustness.

Depending on the degree of robustness of pre-chamber ignition with an active pre-chamber, adjusting canister purge flow based on speed/load thresholds and canister purge flow magnitude thresholds may differ. For example, adjusting the canister purge flow based on degree of robustness at steady state operating conditions may include adjusting canister purge flow to a different canister purge flow magnitude than the canister purge flow magnitude at non-steady state operating conditions. In particular, depending on the degree of robustness, the canister purge flow magnitude may exceed or be lower than at non-steady state operating conditions to reduce the frequency of engine performance events that hinder operation of the vehicle.

At 508, the method 500 includes adjusting canister purge flow, quantity of air, or quantity of fuel to increase robustness of pre-chamber ignition. The controller may store further instructions to adjust the quantity of air, quantity of fuel via the fuel injector, and duty cycle of the canister purge valve to establish a third purge flow magnitude within a third canister purge flow magnitude threshold at steady state operating conditions of the engine to increase the degree of robustness of pre-chamber ignition. In particular, the routine may cause the canister purge flow to be adjusted to the third canister purge flow magnitude within the third canister purge flow magnitude threshold wherein performance of an engine with an active pre-chamber ignition is not significantly affected by a change in canister purge flow magnitude to maintain or increase the degree of robustness of pre-chamber ignition. As one example, the third canister purge flow magnitude at steady state operating conditions may be greater or less than canister purge flow magnitude at non-steady state operating conditions to increase the degree of robustness.

Additionally, pre-chamber ignition conditions of an active pre-chamber may be adjusted to increase combustion stability and overall robustness of pre-chamber ignition wherein pre-chamber ignition conditions include quantity of air and quantity of fuel. The quantity of air and quantity of fuel may be adjusted based on operating conditions of various systems, including the engine system, the evaporative emissions system, and the fuel tank system. As such, the quantity of air may be maintained, increased, or decreased and the quantity of fuel may be maintained, increased, or decreased to increase the degree of robustness of pre-chamber ignition with an active pre-chamber. The method 500 then ends.

Responsive to engine operation with a passive pre-chamber, the method 500 includes determining a purge flow magnitude to maintain robustness of pre-chamber ignition based on current speed/load at 510. The routine may utilize the plurality of parameters described above to assess the degree of robustness of pre-chamber ignition at the current operating conditions and/or speed/load and determine the purge flow magnitude to maintain robustness and potentially empty the purge canister quicker. Adjusting the canister purge flow based on degree of robustness at steady state operating conditions may include adjusting canister purge flow to a different canister purge flow magnitude than at non-steady state operating conditions. In some embodiments, the adjustment of the canister purge flow may maintain the degree of robustness. In other embodiments, the adjustment of the canister purge flow may increase the degree of robustness. In particular, depending on the degree of robustness, the canister purge flow magnitude of a passive pre-chamber may exceed or be lower than at non-steady state operating conditions to reduce the frequency of engine performance events that hinder operation of the vehicle.

At 512, the method 500 include adjusting canister purge flow magnitude based on current speed/load. The controller stores further instructions to a duty cycle of the canister purge valve to establish a fourth purge flow magnitude within a fourth canister purge flow magnitude threshold at robust pre-chamber ignitions conditions at steady-state operating conditions of the engine to maintain or increase robustness of pre-chamber ignition. In particular, the routine may cause the canister purge flow magnitude to be adjusted to the fourth canister purge flow magnitude within the fourth canister purge flow magnitude threshold wherein performance of an engine with a passive pre-chamber ignition is not significantly affected by a change in canister purge flow magnitude to maintain or increase the degree of robustness of pre-chamber ignition. As one example, the fourth canister purge flow magnitude at steady state operating conditions may be greater or less than canister purge flow magnitude at non-steady state operating conditions to maintain or increase the degree of robustness.

FIGS. 6-8 show timing diagrams for a first example of a canister purging event wherein pre-chamber ignition is disabled, a second example of a canister purging event wherein pre-chamber ignition is non-robust, and a third example of a canister purging event wherein pre-chamber ignition is robust. The timing diagrams include canister purging events as the system transitions from non-steady state operating conditions to steady state operating conditions. The system may be, in one example, the system described above with respect to FIGS. 1 and 2. The canister purging events may be realized according to the methods described herein, such as the methods of FIG. 4 and FIG. 5.

The timing diagrams include a plurality of parameters that vary over time. The plurality of parameters may be various parameters monitored during operation of an engine system and evaporative emission system, in some embodiments. More specifically, the plurality of parameters may include rate of change of speed/load of an engine in the engine system, the status of the pre-chamber, fuel vapor concentration, robustness of pre-chamber ignition, canister purge valve (CPV) status, and purge canister load, and canister purge flow.

Turning to FIG. 6, the timing diagram 600 depicted illustrates how a canister purging event may be conducted according to the methods of FIG. 4 and FIG. 5 when a pre-chamber of the engine is disabled. Timing diagram 600 includes plot 602, indicating whether rate of change of speed/load of the engine indicates the engine system is operating at non-steady state or steady-state, over time. Timing diagram 600 further includes plot 608, indicating whether the pre-chamber is enabled, over time. Timing diagram 600 further includes plot 610, indicating whether fuel vapor concentration of canister purge flow is known, over time. Timing diagram 600 further includes plot 612 may indicate whether robustness conditions of pre-chamber ignition are satisfied. Timing diagram 600 further includes plot 614, indicating a status of the CPV (fully open or fully closed), over time. Timing diagram 600 further includes plot 616, indicating purge canister load, over time. Purge canister load may increase (+) or decrease (−), over time. A purge canister load threshold (e.g., 5% loaded or less) may be represented by the dashed line 618. Timing diagram 600 further includes plot 620, indicating a canister purge flow, over time. There may be no purge flow (0), or purge flow may increase (+) as compared to no flow.

At time t0, while not explicitly illustrated it may be understood that the vehicle is being propelled via engine operation. The engine is operating at non-steady state conditions as the plot 602 is not within a rate of change threshold 604. As shown in plot 608, pre-chamber ignition conditions are not satisfied, as indicated by the pre-chamber being disabled. Since the pre-chamber is disabled, it follows that robustness conditions of pre-chamber ignition are not satisfied as shown in plot 612. Additionally, plot 610 indicates that fuel vapor concentration of the canister purge flow is unknown. However, conditions are not yet met for purging the canister as plot 620 indicates that canister purge flow has not been enabled (e.g., canister purge flow value of zero). Thus, the CPV is closed (plot 614). Further, the canister is loaded to some degree (plot 616).

At time t1, conditions are indicated to be met for purging the canister of stored fuel vapors It may be understood that conditions are met because canister load is such that canister purging is requested, the engine is operating to combust air and fuel, and there is sufficient intake manifold vacuum (not shown) for executing a purging operation. Since the rate of change of speed/load of the engine is not within the rate of change threshold 604, the engine system remains operating at non-steady state operating conditions. Further, the pre-chamber remains disabled (plot 608) and pre-chamber ignition is disabled. As such, the pre-chamber ignition conditions are not robust in plot 612.

Accordingly, responsive to canister purging conditions being satisfied and fuel vapor concentration being unknown (plot 610), at time t1, the CPV is commanded to an initial duty cycle (plot 614). Between time t1 and t2, the canister load, as shown in plot 616, decreases due to the canister purge flow being increased responsive to the initial duty cycle being implemented.

Between t2 and t3, the CPV duty cycle is gradually ramped from the initial duty cycle responsive to commands from a controller. Due to the CPV duty cycle being increased, canister purge flow magnitude (plot 620) is greater than the initial duty cycle. In this way, canister load in plot 620 is being unloaded faster than when the canister purge valve in plot 614 is operating according to the initial duty cycle. Thus, at time t3, the gradual ramping of the canister purge flow (plot 620) resulted in a decreased canister load (plot 616) while maintaining operation at non-steady state operating conditions according to plot 602 without pre-chamber ignition, while fuel vapor concentration remains unknown (plot 610).

Between time t3 and t4, the CPV duty cycle is maintained and canister purge flow is maintained while the engine system continues to operate at non-steady state operating conditions without pre-chamber ignition and vapor fuel concentration remains unknown. As depicted in plot 616, the canister load continues to decrease.

At time t4, the fuel vapor concentration is learned as indicated by the plot 610 while the engine system continues to operate at non-steady state conditions and pre-chamber ignition is not enabled. The learning of the fuel vapor concentration stemming from the canister may be used to correspondingly adjust the CPV duty cycle. Accordingly, at time t4, it may be understood that the controller of the vehicle determines that the CPV duty cycle may be increased, and thus, between time t4 and t5, the CPV duty cycle is commanded to increase rate as shown in plot 614. Responsive to the CPV duty cycle being adjusted, the canister purge flow in plot 620 increases and canister load in plot 616 decreases.

Between time t4 and t5, the engine system begins operating at steady state operating conditions as depicted by the plot 602 at an intersection point 606 between the plot 602 and the rage of change threshold 604. Responsive to the engine system operating at steady state operating conditions, at time t5 the controller command may cause the CPV duty cycle to be increased as shown in plot 614 resulting in an increase in canister purge flow (plot 620). In this way, the purge canister load may be unloaded more rapidly as shown by the decrease in canister load depicted in plot 616. After the time t5, the CPV duty cycle and the canister purge flow is maintained in the timing diagram 600.

Thus, the timing diagram 600 discussed above illustrates how controlling a canister purging event is performed when pre-chamber ignition is not enabled. In some embodiments, the gradual ramping of canister purge flow prior to learning fuel vapor concentration of canister purge flow may result in insufficient canister purging frequency that may lead to undesirable bleed emissions.

As shown in FIG. 7, the timing diagram 700 depicted illustrates how a canister purging event may be conducted according to the methods of FIG. 4 and FIG. 5 when pre-chamber ignition is non-robust. Timing diagram 700 includes plot 702, indicating whether rate of change of speed/load of the engine indicates the engine system is operating at non-steady state or steady-state, over time. Timing diagram 700 further includes plot 708, indicating whether the pre-chamber is enabled, over time. Timing diagram 700 further includes plot 710, indicating whether fuel vapor concentration of canister purge flow is known, over time. Timing diagram 700 further includes plot 712 may indicate whether robustness conditions of pre-chamber ignition are satisfied. Timing diagram 700 further includes plot 714, indicating a status of the CPV (fully open or fully closed), over time. Timing diagram 700 further includes plot 716, indicating purge canister load, over time. Purge canister load may increase (+) or decrease (−), over time. A purge canister load threshold (e.g., 5% loaded or less) may be represented by the dashed line 718. Timing diagram 700 further includes plot 720, indicating a canister purge flow, over time. There may be no purge flow (0), or purge flow may increase (+) as compared to no flow.

At time t0, while not explicitly illustrated it may be understood that the vehicle is being propelled via engine operation. The engine is operating at non-steady state conditions as the plot 702 is not within a rate of change threshold 704. As shown in plot 708, pre-chamber ignition conditions are satisfied, as indicated by the pre-chamber being enabled. Further, robustness conditions of pre-chamber ignition are not satisfied as shown in plot 712. Additionally, plot 710 indicates that fuel vapor concentration of the canister purge flow is unknown. However, conditions are not yet met for purging the canister as plot 720 indicates that canister purge flow has not been enabled (e.g., canister purge flow value of zero). Thus, the CPV is closed (plot 714). Further, the canister is loaded to some degree (plot 716).

At time t1, conditions are indicated to be met for purging the canister of stored fuel vapors It may be understood that conditions are met because canister load is such that canister purging is requested, the engine is operating to combust air and fuel, and there is sufficient intake manifold vacuum (not shown) for executing a purging operation. Since the rate of change of speed/load of the engine is not within the rate of change threshold 704, the engine system remains operating at non-steady state operating conditions. Further, the pre-chamber remains enabled (plot 708) and pre-chamber ignition is enabled. However, the pre-chamber ignition conditions are not robust in plot 712 at time t1.

Accordingly, responsive to canister purging conditions being satisfied and fuel vapor concentration being unknown (plot 710), at time t1, the CPV is commanded to an initial duty cycle (plot 714). Between time t1 and t2, the canister load, as shown in plot 716, decreases due to the canister purge flow being increased responsive to the initial duty cycle being implemented.

Between t2 and t3, the CPV duty cycle is gradually ramped from the initial duty cycle responsive to commands from a controller. Due to the CPV duty cycle being increased, canister purge flow magnitude (plot 720) is greater than the initial duty cycle. In this way, canister load in plot 720 is being unloaded faster than when the canister purge valve in plot 714 is operating according to the initial duty cycle. Thus, at time t3, the gradual ramping of the canister purge flow (plot 720) resulted in a decreased canister load (plot 716) while maintaining operation at non-steady state operating conditions according to plot 702 with non-robust pre-chamber ignition, while fuel vapor concentration remains unknown (plot 710).

At time t3, the fuel vapor concentration is learned as indicated by the plot 710 while the engine system continues to operate at non-steady state conditions and pre-chamber ignition is enabled. The learning of the fuel vapor concentration stemming from the canister may be used to correspondingly adjust the CPV duty cycle. Accordingly, at time t3, it may be understood that the controller of the vehicle determines that the CPV duty cycle may be increased, and thus, between time t3 and t4, the CPV duty cycle is commanded to increase rate as shown in plot 714. Responsive to the CPV duty cycle being adjusted, the canister purge flow in plot 720 increases and canister load in plot 716 decreases. In some embodiments, the CPV duty cycle may increase to a first canister purge flow magnitude within a first canister purge flow magnitude. The first canister purge flow magnitude may be higher than the canister purge flow in embodiments wherein pre-chamber ignition is not enabled (e.g., FIG. 6). In this way, canister load may be unloaded faster which may reduce the frequency of bleed emissions.

Between time t4 and t5, the CPV duty cycle is maintained and canister purge flow is maintained while the engine system continues to operate at non-steady state operating conditions without pre-chamber ignition and vapor fuel concentration remains unknown. As depicted in plot 716, the canister load continues to decrease. Further, the engine system begins operating at steady state operating conditions as depicted by the plot 702 at an intersection point 706 between the plot 702 and the rage of change threshold 704.

Responsive to the engine system operating at steady state operating conditions, at time t5 the controller command may cause the CPV duty cycle to be increased as shown in plot 714 resulting in an increase in canister purge flow (plot 720). In some embodiments, pre-chamber ignition may tolerate higher canister purge flows at steady state operating conditions compared to non-steady state operating conditions without negatively affecting vehicle performance. As one example, the canister purge flow may be increased to a third canister purge flow magnitude within a third canister purge flow magnitude threshold. In this way, the purge canister load may be unloaded more rapidly as shown by the decrease in canister load depicted in plot 716 without negatively affecting vehicle performance. After the time t5, the CPV duty cycle and the canister purge flow is maintained in the timing diagram 700.

Thus, the timing diagram 700 discussed above illustrates how controlling a canister purging event is performed when non-robust pre-chamber ignition is enabled. In some embodiments, the ramping of canister purge flow prior to the first canister purge flow magnitude within the first canister purge flow magnitude may enable more rapid purge canister unloading while reducing the frequency of bleed emissions compared to an embodiment wherein pre-chamber ignition is not enabled, such as described above in FIG. 6.

As shown in FIG. 8, the timing diagram 800 depicted illustrates how a canister purging event may be conducted according to the methods of FIG. 4 and FIG. 5 when pre-chamber ignition is non-robust. Timing diagram 800 includes plot 802, indicating whether rate of change of speed/load of the engine indicates the engine system is operating at non-steady state or steady-state, over time. Timing diagram 800 further includes plot 808, indicating whether the pre-chamber is enabled, over time. Timing diagram 800 further includes plot 810, indicating whether fuel vapor concentration of canister purge flow is known, over time. Timing diagram 800 further includes plot 812 may indicate whether robustness conditions of pre-chamber ignition are satisfied. Timing diagram 800 further includes plot 814, indicating a status of the CPV (fully open or fully closed), over time. Timing diagram 800 further includes plot 816, indicating purge canister load, over time. Purge canister load may increase (+) or decrease (−), over time. A purge canister load threshold (e.g., 5% loaded or less) may be represented by the dashed line 818. Timing diagram 800 further includes plot 820, indicating a canister purge flow, over time. There may be no purge flow (0), or purge flow may increase (+) as compared to no flow.

At time t0, while not explicitly illustrated it may be understood that the vehicle is being propelled via engine operation. The engine is operating at non-steady state conditions as the plot 802 is not within a rate of change threshold 804. As shown in plot 808, pre-chamber ignition conditions are satisfied, as indicated by the pre-chamber being enabled. Further, robustness conditions of pre-chamber ignition are satisfied as shown in plot 812. Additionally, plot 810 indicates that fuel vapor concentration of the canister purge flow is unknown. However, conditions are not yet met for purging the canister as plot 820 indicates that canister purge flow has not been enabled (e.g., canister purge flow value of zero). Thus, the CPV is closed (plot 814). Further, the canister is loaded to some degree (plot 816).

At time t1, conditions are indicated to be met for purging the canister of stored fuel vapors It may be understood that conditions are met because canister load is such that canister purging is requested, the engine is operating to combust air and fuel, and there is sufficient intake manifold vacuum (not shown) for executing a purging operation. Since the rate of change of speed/load of the engine is not within the rate of change threshold 804, the engine system remains operating at non-steady state operating conditions. Further, the pre-chamber remains enabled (plot 808) and pre-chamber ignition is enabled. However, the pre-chamber ignition conditions are robust in plot 812 at time t1.

Accordingly, responsive to canister purging conditions being satisfied and fuel vapor concentration being unknown (plot 810), at time t1, the CPV is commanded to a duty cycle (plot 814) to enable a canister purge flow proportional to degree of robustness of pre-chamber ignition. Between time t1 and t2, the canister load, as shown in plot 816, decreases due to the canister purge flow being increased responsive to the duty cycle being implemented. In some embodiments wherein canister purge flow is based on degree of robustness, the canister purge flow magnitude may exceed that of embodiments wherein pre-chamber ignition is either not utilized (e.g., FIG. 6) or pre-chamber ignition is non-robust (e.g., FIG. 7).

At time t2, the fuel vapor concentration is learned as indicated by the plot 810 while the engine system continues to operate at non-steady state conditions and pre-chamber ignition is not enabled. The learning of the fuel vapor concentration stemming from the canister may be used to correspondingly adjust the CPV duty cycle. Accordingly, at time t3, it may be understood that the controller of the vehicle determines that the CPV duty cycle may be increased, and thus, between time t2 and t3, the CPV duty cycle is commanded to increase rate as shown in plot 814. Responsive to the CPV duty cycle being adjusted, the canister purge flow in plot 820 increases and canister load in plot 816 decreases.

Due to the CPV duty cycle being increased, canister purge flow magnitude (plot 820) is greater than the previous duty cycle based on degree of robustness. In this way, canister load in plot 820 is being unloaded faster than when the canister purge valve in plot 814 is operating according to the previous duty cycle. In some embodiments, the CPV duty cycle may increase to a second canister purge flow magnitude within a second canister purge flow magnitude. The second canister purge flow magnitude may be higher than the first canister purge flow magnitude in embodiments wherein pre-chamber ignition is non-robust (e.g., FIG. 7). In this way, canister load may be unloaded faster which may reduce the frequency of bleed emissions.

Between both time t3 and time t4 and time t4 and t5, the CPV duty cycle is maintained and canister purge flow is maintained while the engine system continues to operate at non-steady state operating conditions without pre-chamber ignition and vapor fuel concentration remains unknown. As depicted in plot 816, the canister load continues to decrease. Further, the engine system begins operating at steady state operating conditions as depicted by the plot 802 at an intersection point 806 between the plot 802 and the rage of change threshold 804 at time t5.

Responsive to the engine system operating at steady state operating conditions, at time t5 the controller command may cause the CPV duty cycle to be increased as shown in plot 814 resulting in an increase in canister purge flow (plot 820). In some embodiments, pre-chamber ignition may tolerate higher canister purge flows at steady state operating conditions compared to non-steady state operating conditions without negatively affecting vehicle performance. As one example, the canister purge flow may be increased to a fourth canister purge flow magnitude within a fourth canister purge flow magnitude threshold. In this way, the purge canister load may be unloaded more rapidly as shown by the decrease in canister load depicted in plot 816 without negatively affecting vehicle performance. After the time t5, the CPV duty cycle and the canister purge flow is maintained in the timing diagram 800.

Thus, the timing diagram 800 discussed above illustrates how controlling a canister purging event is performed when robust pre-chamber ignition is enabled. In some embodiments, the ramping of canister purge flow prior to the first canister purge flow magnitude within the first canister purge flow magnitude may enable more rapid purge canister unloading while reducing the frequency of bleed emissions compared to an embodiment wherein pre-chamber ignition is not enabled or non-robust, such as described above in FIG. 6 and FIG. 7 respectively.

The technical effect of adjusting canister purge flow based on robustness conditions of pre-chamber ignition of an engine at non-steady state operating conditions and steady state operating conditions is to increase the frequency of canister purging events and reducing the frequency of bleed emissions that do not satisfy environmental standards without negatively affecting vehicle performance. For example, compared to current systems, performing canister purging events based on robustness may allow for higher canister purge flow without increasing the frequency of vehicle performance events, such as hesitations and stumbles. In this way, the technical effect of performing canister purging events based on robustness is that higher canister purge flows may be allowed and as a result, the purge canister may be unloaded more rapidly which may allow fuel vapor concentration of canister purge flow to be determined sooner and allow for more refined control over the engine system and evaporative emission system.

The systems and methods discussed herein may enable one or more systems and one or more methods. In one example a method comprises adjusting canister purge flow based on robustness conditions of pre-chamber ignition of an engine at non-steady state operating conditions. In a first example of the method, adjusting canister purge flow based on robustness conditions of pre-chamber ignition of the engine at non-steady steady operating conditions comprises: not enabling canister purge flow responsive to determining canister purging conditions are not satisfied based on engine operating conditions, and enabling canister purge flow responsive to determining canister purging conditions are satisfied based on engine operating conditions.

In a second example of the method, optionally including the first example, enabling canister purge flow responsive to determining canister purging conditions are satisfied based on engine operating conditions comprises: maintaining a gradual ramping of canister purge flow responsive to a disabled pre-chamber ignition, and adjusting canister purge flow based on robustness conditions responsive to an enabled pre-chamber ignition. In a third example of the method, optionally including one or both of the first and second examples, adjusting canister purge flow based on robustness conditions responsive to the enabled pre-chamber ignition comprises: increasing canister purge flow responsive to robustness conditions being satisfied via ramping duty cycle, and maintaining gradual ramping of canister purge flow responsive to robustness conditions not being satisfied.

In a fourth example of the method, optionally including one or more or each of the first through third examples, the method further comprises: determining fuel vapor concentrations of the canister purge flow, increasing canister purge flow responsive to robustness conditions not being satisfied via ramping canister purge flow to a first canister purge flow magnitude within a first purge flow magnitude threshold, and increasing canister purge flow responsive to robustness conditions being satisfied via ramping canister purge flow to a second canister purge flow magnitude within a second canister purge flow magnitude threshold. In a fifth example of the method, optionally including one or more or each of the first through fourth examples, robustness conditions comprise operating conditions wherein the engine operates at air to fuel ratios that are under or exceed stoichiometric ratios and wherein canister purge flow is adjusted proportionally based on a degree of robustness of pre-chamber ignition.

In a sixth example of the method, optionally including one or more or each of the first through fifth examples, the second canister purge flow magnitude is greater than the first canister purge flow magnitude. In a seventh example of the method, optionally including one or more or each of the first through sixth examples, the degree of robustness of the robustness conditions comprises speed/load thresholds at pre-determined canister purge flow magnitude thresholds. In an eighth example of the method, optionally including one or more or each of the first through seventh examples, the method further comprises: adjusting canister purge flow based on robustness conditions of pre-chamber ignition of the engine at steady state operating conditions.

Another example of a method comprises evaluating pre-chamber ignition robustness based on speed/load thresholds of an engine and canister purge flow magnitude thresholds at steady state operating conditions, and adjusting canister purge flow based on evaluated pre-chamber ignition robustness. In a first example of the method, evaluating pre-chamber ignition robustness based on speed/load thresholds of the engine and canister purge flow magnitude thresholds at steady state operating conditions comprises determining speed/load thresholds and canister purge flow magnitudes thresholds with similar degrees of robustness wherein similar degrees of robustness comprise averaged speed/load thresholds and averaged canister purge flow magnitude thresholds that have similar engine performance without engine hesitations occurring. In a second example of the method, optionally including the first example, adjusting canister purge flow based on speed/load thresholds and canister purge flow magnitude thresholds at steady state operating conditions comprises adjusting canister purge flow to a different canister purge flow magnitude than canister purge flow magnitude at non-steady state operating conditions.

In a third example of the method, optionally including one or both of the first and second examples, canister purge flow may be adjusted to a third canister purge flow magnitude within a third canister purge flow magnitude threshold wherein performance of an engine with an active pre-chamber ignition is not significantly affected by a change in canister purge flow magnitude to maintain or increase degree of robustness of pre-chamber ignition. In a fourth example of the method, optionally including one or more or each of the first through third examples, canister purge flow may be adjusted to a fourth canister purge flow magnitude within a fourth canister purge flow magnitude threshold wherein performance of an engine with a passive pre-chamber ignition is not significantly affected by a change in canister purge flow magnitude to maintain degree of robustness of pre-chamber ignition. In a fifth example of the method, optionally including one or more or each of the first through fourth examples, pre-chamber ignition conditions of an active pre-chamber may be adjusted to increase combustion stability and overall robustness of pre-chamber ignition conditions wherein pre-chamber ignition conditions include quantity of air and quantity of fuel.

An example of a system for a vehicle comprises a purge canister that receives fuel vapors from a fuel tank, a canister purge valve for purging fuel vapors stored at the purge canister to an engine comprising a pre-chamber for pre-chamber ignition, and a controller, communicatively coupled to a plurality of sensors and actuators, with computer readable instructions stored on non-transitory memory that when executed, cause the controller to: not enable a canister purging event in response to an indication that canister purging conditions are not satisfied, and enable the canister purging event via adjusting the canister purge valve in response to the indication that canister purging conditions are satisfied at non-steady state and steady state operating conditions of the engine wherein an amount of canister purge flow during ramping is based on a robustness of pre-chamber ignition combustion.

In a first example of the system, the system further comprises: a fuel tank pressure transducer to monitor fuel tank pressure, a hydrocarbon sensor positioned in a vent line that couples the purge canister to atmosphere, a canister temperature sensor positioned in the purge canister within a threshold distance of a vent port of the purge canister, and wherein the controller stores further instructions to monitor a fuel vaporization rate of fuel in the fuel tank via the fuel tank pressure transducer and the canister temperature sensor, indicate that fuel vapors are migrating into the vent line as monitored via the hydrocarbon sensor, immediately prior to and/or during the canister purging event, and adjust or maintain canister purge flow rate during operation of the engine wherein pre-chamber ignition is enabled and pre-chamber ignition is not enabled at non-steady steady operating conditions of the engine based on operating conditions and signal outputs from the fuel tank pressure transducer, hydrocarbon sensor, and the canister temperature sensor.

In a second example of the system, optionally including the first example, the system further comprises: an exhaust gas oxygen sensor, wherein the controller stores further instructions to learn a concentration of fuel vapors being inducted to the engine during the canister purging event based on at least in part on output from the exhaust gas oxygen sensor, and wherein the controller stores further instructions to a duty cycle of the canister purge valve to establish one of a first canister purge flow magnitude within a first canister purge flow magnitude threshold at non-robust pre-chamber ignitions or a second canister purge flow magnitude within a second canister purge flow magnitude threshold at robust pre-chamber ignitions responsive to learning concentration of fuel vapors being inducted to the engine at non-steady-state operating conditions.

In a third example of the system, optionally including one or both of the first and second examples, the system further comprises: the engine with a passive pre-chamber comprising a spark plug, and wherein the controller stores further instructions to a duty cycle of the canister purge valve to establish a fourth purge flow magnitude within a fourth canister purge flow magnitude threshold at robust pre-chamber ignitions conditions at steady-state operating conditions of the engine to maintain degree of robustness of pre-chamber ignition. In a fourth example of the system, optionally including one or more or each of the first through third examples, the system further comprises: the engine with an active pre-chamber comprising a spark plug and a fuel injector, and wherein the controller stores further instructions to adjust the quantity of air and quantity of fuel via the fuel injector and duty cycle of the canister purge valve to establish a third purge flow magnitude within a third canister purge flow magnitude threshold at steady state operating conditions of the engine to increase or maintain degree of robustness of pre-chamber ignition.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:

adjusting canister purge flow based on robustness conditions of pre-chamber ignition of an engine at non-steady state operating conditions.

2. The method of claim 1, wherein adjusting canister purge flow based on robustness conditions of pre-chamber ignition of the engine at non-steady steady operating conditions comprises:

not enabling canister purge flow responsive to determining canister purging conditions are not satisfied based on engine operating conditions; and enabling canister purge flow responsive to determining canister purging conditions are satisfied based on engine operating conditions.

3. The method of claim 2, wherein enabling canister purge flow responsive to determining canister purging conditions are satisfied based on engine operating conditions comprises:

maintaining a gradual ramping of canister purge flow responsive to a disabled pre-chamber ignition; and adjusting canister purge flow based on robustness conditions responsive to an enabled pre-chamber ignition.

4. The method of claim 3, wherein adjusting canister purge flow based on robustness conditions responsive to the enabled pre-chamber ignition comprises:

increasing canister purge flow responsive to robustness conditions being satisfied via ramping duty cycle; and maintaining gradual ramping of canister purge flow responsive to robustness conditions not being satisfied.

5. The method of claim 4, further comprising:

determining fuel vapor concentrations of the canister purge flow;

increasing canister purge flow responsive to robustness conditions not being satisfied via ramping canister purge flow to a first canister purge flow magnitude within a first purge flow magnitude threshold; and increasing canister purge flow responsive to robustness conditions being satisfied via ramping canister purge flow to a second canister purge flow magnitude within a second canister purge flow magnitude threshold.

6. The method of claim 1, wherein robustness conditions comprise operating conditions wherein the engine operates at air to fuel ratios that are under or exceed stoichiometric ratios and wherein canister purge flow is adjusted proportionally based on a degree of robustness of pre-chamber ignition.

7. The method of claim 5, wherein the second canister purge flow magnitude is greater than the first canister purge flow magnitude.

8. The method of claim 6, wherein the degree of robustness of the robustness conditions comprises speed/load thresholds at pre-determined canister purge flow magnitude thresholds.

9. The method of claim 1, further comprising adjusting canister purge flow based on robustness conditions of pre-chamber ignition of the engine at steady state operating conditions.

10. A method, comprising:

evaluating pre-chamber ignition robustness based on speed/load thresholds of an engine and canister purge flow magnitude thresholds at steady state operating conditions; and adjusting canister purge flow based on evaluated pre-chamber ignition robustness.

11. The method of claim 10, wherein evaluating pre-chamber ignition robustness based on speed/load thresholds of the engine and canister purge flow magnitude thresholds at steady state operating conditions comprises determining speed/load thresholds and canister purge flow magnitudes thresholds with similar degrees of robustness wherein similar degrees of robustness comprise averaged speed/load thresholds and averaged canister purge flow magnitude thresholds that have similar engine performance without engine hesitations occurring.

12. The method of claim 10, wherein adjusting canister purge flow based on speed/load thresholds and canister purge flow magnitude thresholds at steady state operating conditions comprises adjusting canister purge flow to a different canister purge flow magnitude than canister purge flow magnitude at non-steady state operating conditions.

13. The method of claim 12, wherein canister purge flow may be adjusted to a third canister purge flow magnitude within a third canister purge flow magnitude threshold wherein performance of an engine with an active pre-chamber ignition is not significantly affected by a change in canister purge flow magnitude to maintain or increase degree of robustness of pre-chamber ignition.

14. The method of claim 12, wherein canister purge flow may be adjusted to a fourth canister purge flow magnitude within a fourth canister purge flow magnitude threshold wherein performance of an engine with a passive pre-chamber ignition is not significantly affected by a change in canister purge flow magnitude to maintain degree of robustness of pre-chamber ignition.

15. The method of claim 13, wherein pre-chamber ignition conditions of an active pre-chamber may be adjusted to increase combustion stability and overall robustness of pre-chamber ignition conditions wherein pre-chamber ignition conditions include quantity of air and quantity of fuel.

16. A system for a vehicle, comprising:

a purge canister that receives fuel vapors from a fuel tank;

a canister purge valve for purging fuel vapors stored at the purge canister to an engine comprising a pre-chamber for pre-chamber ignition; and a controller, communicatively coupled to a plurality of sensors and actuators, with computer readable instructions stored on non-transitory memory that when executed, cause the controller to:

not enable a canister purging event in response to an indication that canister purging conditions are not satisfied; and enable the canister purging event via adjusting the canister purge valve in response to the indication that canister purging conditions are satisfied at non-steady state and steady state operating conditions of the engine wherein an amount of canister purge flow during ramping is based on a robustness of pre-chamber ignition combustion.

17. The system of claim 16, further comprising:

a fuel tank pressure transducer to monitor fuel tank pressure;

a hydrocarbon sensor positioned in a vent line that couples the purge canister to atmosphere;

a canister temperature sensor positioned in the purge canister within a threshold distance of a vent port of the purge canister; and wherein the controller stores further instructions to monitor a fuel vaporization rate of fuel in the fuel tank via the fuel tank pressure transducer and the canister temperature sensor, indicate that fuel vapors are migrating into the vent line as monitored via the hydrocarbon sensor, immediately prior to and/or during the canister purging event, and adjust or maintain canister purge flow rate during operation of the engine wherein pre-chamber ignition is enabled and pre-chamber ignition is not enabled at non-steady steady operating conditions of the engine based on operating conditions and signal outputs from the fuel tank pressure transducer, hydrocarbon sensor, and the canister temperature sensor.

18. The system of claim 16, further comprising:

an exhaust gas oxygen sensor;

wherein the controller stores further instructions to learn a concentration of fuel vapors being inducted to the engine during the canister purging event based on at least in part on output from the exhaust gas oxygen sensor; and wherein the controller stores further instructions to a duty cycle of the canister purge valve to establish one of a first canister purge flow magnitude within a first canister purge flow magnitude threshold at non-robust pre-chamber ignitions or a second canister purge flow magnitude within a second canister purge flow magnitude threshold at robust pre-chamber ignitions responsive to learning concentration of fuel vapors being inducted to the engine at non-steady-state operating conditions.

19. The system of claim 16, further comprising:

the engine with a passive pre-chamber comprising a spark plug; and wherein the controller stores further instructions to a duty cycle of the canister purge valve to establish a fourth purge flow magnitude within a fourth canister purge flow magnitude threshold at robust pre-chamber ignitions conditions at steady-state operating conditions of the engine to maintain degree of robustness of pre-chamber ignition.

20. The system of claim 16, further comprising:

the engine with an active pre-chamber comprising a spark plug and a fuel injector; and wherein the controller stores further instructions to adjust quantity of air and quantity of fuel via the fuel injector and duty cycle of the canister purge valve to establish a third purge flow magnitude within a third canister purge flow magnitude threshold at steady state operating conditions of the engine to increase or maintain degree of robustness of pre-chamber ignition.

* * * * *